(12) United States Patent
Ku et al.

(10) Patent No.: US 12,148,362 B2
(45) Date of Patent: Nov. 19, 2024

(54) INPUT SENSING DEVICE AND DISPLAY DEVICE INCLUDING THE SAME

(71) Applicant: Samsung Display Co., Ltd., Yongin-si (KR)

(72) Inventors: Kyowon Ku, Yongin-si (KR); Sanghyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/234,792

(22) Filed: Aug. 16, 2023

(65) Prior Publication Data

US 2024/0127740 A1    Apr. 18, 2024

(30) Foreign Application Priority Data

Oct. 13, 2022  (KR) .................. 10-2022-0131516

(51) Int. Cl.
*G09G 3/32* (2016.01)
(52) U.S. Cl.
CPC ...................... *G09G 3/32* (2013.01)
(58) Field of Classification Search
CPC ....... G09G 3/32; G06F 3/041; G06F 3/04166; G06F 3/04182; G06F 3/0446; G06F 3/0418; G06F 3/044; G06F 3/046; H10K 50/844; H10K 59/40
See application file for complete search history.

(56) References Cited

U.S. PATENT DOCUMENTS

| | | | |
|---|---|---|---|
| 9,349,311 B2 | 5/2016 | Yu et al. | |
| 10,146,985 B2 | 12/2018 | Chung et al. | |
| 11,093,060 B2 | 8/2021 | Yancey et al. | |
| 2010/0226459 A1 | 9/2010 | Park et al. | |
| 2010/0308935 A1* | 12/2010 | Visconti | H03H 11/126 333/173 |
| 2012/0256869 A1* | 10/2012 | Walsh | G06F 3/04166 327/345 |
| 2016/0306465 A1* | 10/2016 | Ahn | G06F 3/04166 |

FOREIGN PATENT DOCUMENTS

| | | |
|---|---|---|
| KR | 10-0889742 B1 | 3/2009 |
| KR | 10-1529005 B1 | 6/2015 |
| KR | 10-2018-0015025 A | 2/2018 |
| KR | 10-2019-0078784 A | 7/2019 |

* cited by examiner

*Primary Examiner* — Md Saiful A Siddiqui
(74) *Attorney, Agent, or Firm* — Lewis Roca Rothgerber Christie LLP

(57) ABSTRACT

An input sensing device includes: an input sensor including a transmission electrode, a first reception electrode, and a second reception electrode; and a readout circuit configured to provide a transmit signal to the transmission electrode, to receive a first receive signal from the first reception electrode, and to receive a second receive signal from the second reception electrode, wherein the readout circuit includes: a switching circuit configured to transfer the first receive signal and the second receive signal to a first node and a second node, respectively, during a touch sensing period and to transfer one of the first receive signal and the second receive signal to the first node and the second node during a compensation period; a first output circuit configured to convert a signal of the first node into a first sensing signal; and a second output circuit configured to convert a signal of the second node into a second sensing signal.

20 Claims, 16 Drawing Sheets

INPUT SENSING DEVICE AND DISPLAY DEVICE INCLUDING THE SAME

CROSS-REFERENCE TO RELATED APPLICATIONS

The present application claims priority to and the benefit of Korean Patent Application No. 10-2022-0131516 filed on Oct. 13, 2022, in the Korean Intellectual Property Office, the entire disclosure of which is incorporated herein by reference.

BACKGROUND

Aspects of some embodiments of the present disclosure described herein relate to a display device, and for example, relate to a display device including an input sensing device.

A multimedia electronic device such as a television (TV), a mobile phone, a tablet computer, a navigation system, or a game console may include a display device for displaying images. In addition to a general input device such as a button, a keyboard, or a mouse, an electronic device may include a display device capable of providing a touch-based input scheme that allows a user to enter information or commands.

The above information disclosed in this Background section is only for enhancement of understanding of the background and therefore the information discussed in this Background section does not necessarily constitute prior art.

SUMMARY

Aspects of some embodiments of the present disclosure provide a display device capable of sensing an input of a user more accurately and a display device including the same.

According to some embodiments, an input sensing device includes an input sensor that includes a transmission electrode, a first reception electrode, and a second reception electrode, and a readout circuit that provides a transmit signal to the transmission electrode, receives a first receive signal from the first reception electrode, and receives a second receive signal from the second reception electrode. The readout circuit includes a switching circuit that transfers the first receive signal and the second receive signal to a first node and a second node respectively during a touch sensing period and transfers one of the first receive signal and the second receive signal to the first node and the second node during a compensation period, a first output circuit that converts a signal of the first node into a first sensing signal, and a second output circuit that converts a signal of the second node into a second sensing signal.

According to some embodiments, during the touch sensing period, the first output circuit may mix the signal of the first node and a first carrier so as to be output as the first sensing signal, and the second output circuit may mix the signal of the second node and the first carrier so as to be output as the second sensing signal.

According to some embodiments, during the compensation period, the first output circuit may mix the signal of the first node and a first carrier so as to be output as the first sensing signal, and the second output circuit may mix the signal of the second node and a second carrier different from the first carrier so as to be output as the second sensing signal.

According to some embodiments, the first carrier may be an in-phase carrier, and the second carrier may be a quadrature phase carrier.

According to some embodiments, the switching circuit may include a first switch connected between a first reception line connected with the first reception electrode and the first node, a second switch connected between a second reception line connected with the second reception electrode and the second node, and a coupling switch connected between the first node and the second node.

According to some embodiments, during the touch sensing period, the first switch and the second switch may be in an on state, and the coupling switch may be in an off state.

According to some embodiments, the compensation period may include a first compensation period and a second compensation period. During the first compensation period, the first switch and the coupling switch may be in an on state, and the second switch may be in an off state, and during the second compensation period, the second switch and the coupling switch may be in the on state, and the first switch may be in the off state.

According to some embodiments, each of a first frame and a second frame may include the touch sensing period and the compensation period.

According to some embodiments, the readout circuit may calculate touch coordinates of the first frame based on the first sensing signal and the second sensing signal obtained during the touch sensing period of the first frame.

According to some embodiments, the readout circuit may calculate touch coordinates of the second frame based on the first sensing signal and the second sensing signal obtained during the compensation period of the first frame and the first sensing signal and the second sensing signal obtained during the touch sensing period of the second frame.

According to some embodiments, each of a first frame, a second frame, and a third frame may include the touch sensing period and the compensation period. During the compensation period of each of the first frame and the third frame, the switching circuit may output the first receive signal to the first node and the second node, and during the compensation period of the second frame, the switching circuit may output the second receive signal to the first node and the second node.

According to some embodiments, the readout circuit may calculate touch coordinates of the second frame based on the first sensing signal and the second sensing signal obtained during the compensation period of the first frame and the first sensing signal and the second sensing signal obtained during the touch sensing period of the second frame, and the readout circuit may calculate touch coordinates of the third frame based on the first sensing signal and the second sensing signal obtained during the compensation period of the second frame and the first sensing signal and the second sensing signal obtained during the touch sensing period of the third frame.

According to some embodiments, during the compensation period, the switching circuit may output the first receive signal to the first node and the second node, and the readout circuit may calculate touch coordinates of the second frame based on the first sensing signal and the second sensing signal obtained during the compensation period of the first frame and the first sensing signal and the second sensing signal obtained during the touch sensing period of the second frame.

According to some embodiments, a display device includes a display panel, an input sensor that is on the display panel and includes a transmission electrode, a first reception electrode, and a second reception electrode, and a readout circuit that outputs a transmit signal to the transmission electrode, receives a first receive signal from the first reception electrode, and receives a second receive signal from the second reception electrode. The readout circuit includes a switching circuit that transfers the first receive signal and the second receive signal to a first node and a second node respectively during a touch sensing period and transfers one of the first receive signal and the second receive signal to the first node and the second node during a compensation period, a first output circuit that converts a signal of the first node into a first sensing signal, and a second output circuit that converts a signal of the second node into a second sensing signal.

According to some embodiments, during the touch sensing period, the first output circuit may mix the signal of the first node and a first carrier so as to be output as the first sensing signal, and the second output circuit may mix the signal of the second node and the first carrier so as to be output as the second sensing signal.

According to some embodiments, during the compensation period, the first output circuit may mix the signal of the first node and a first carrier so as to be output as the first sensing signal, and the second output circuit may mix the signal of the second node and a second carrier different from the first carrier so as to be output as the second sensing signal.

According to some embodiments, the switching circuit may include a first switch connected between a first reception line connected with the first reception electrode and the first node, a second switch connected between a second reception line connected with the second reception electrode and the second node, and a coupling switch connected between the first node and the second node.

According to some embodiments, during the touch sensing period, the first switch and the second switch may be in an on state, and the coupling switch may be in an off state.

According to some embodiments, the compensation period may include a first compensation period and a second compensation period. During the first compensation period, the first switch and the coupling switch may be in an on state, and the second switch may be in an off state, and during the second compensation period, the second switch and the coupling switch may be in the on state, and the first switch may be in the off state.

According to some embodiments, each of a first frame and a second frame may include the touch sensing period and the compensation period, the readout circuit may calculate touch coordinates of the first frame based on the first sensing signal and the second sensing signal obtained during the touch sensing period of the first frame, and the readout circuit may calculate touch coordinates of the second frame based on the first sensing signal and the second sensing signal obtained during the compensation period of the first frame and the first sensing signal and the second sensing signal obtained during the touch sensing period of the second frame.

BRIEF DESCRIPTION OF THE FIGURES

The above and other characteristics and features of embodiments according to the present disclosure will become more apparent by describing in more detail aspects of some embodiments thereof with reference to the accompanying drawings.

DETAILED DESCRIPTION

Figure 1:
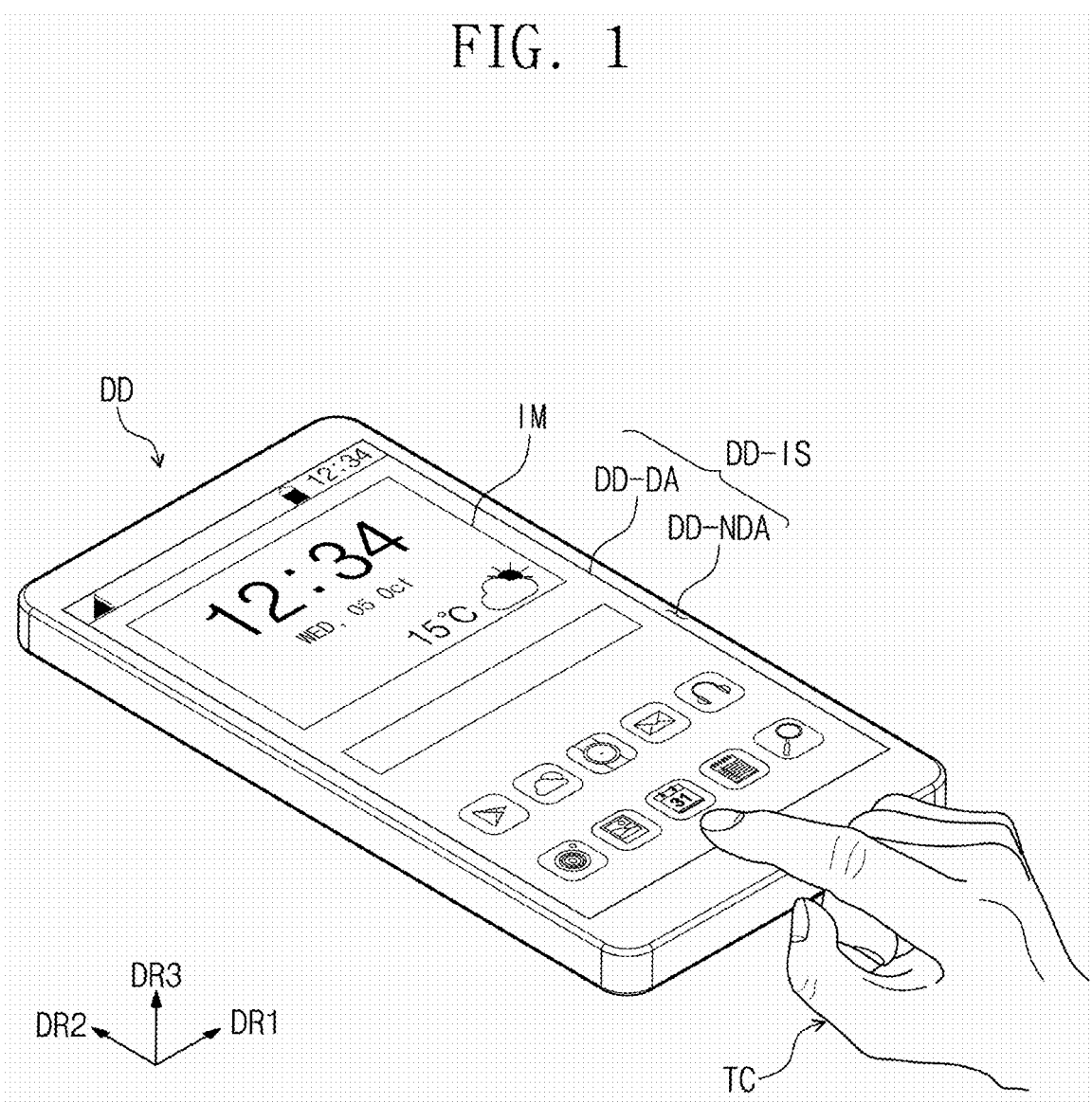
FIG. 1 is a perspective view illustrating a display device according to some embodiments of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

The same reference numerals/signs refer to the same components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are only used to distinguish one component from another component. For example, without departing from the scope and spirit of the invention, a first component may be referred to as a "second component", and similarly, the second component may be referred to as the "first component". The singular forms are intended to include the plural forms unless the context clearly indicates otherwise.

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Below, embodiments of the present disclosure will be described with reference to drawings.

FIG. 1 is a perspective view of a display device DD according to some embodiments of the present disclosure.

As illustrated in FIG. 1, the display device DD may be, for example, a small and medium-sized electronic device, such as a mobile phone, a tablet, a notebook, a vehicle navigation system, or a game console, as well as a large-sized electronic device such as a television or a monitor. The above examples are provided only as examples, and according to some embodiments, the display device DD may include any other display device(s) without departing from the scope and spirit of embodiments according to the present invention. The display device DD may have a generally rectangular shape having a short edge (or side) in a first direction DR1 and a long edge (or side) in a second direction DR2 intersecting the first direction DR1. According to some embodiments, the display device DD may have circular or rounded corners. However, the shape of the display device DD is not limited thereto. For example, the display device DD may be implemented in various shapes in a plan view, such as a polygon, a circle, an oval, etc. The display device DD may display images IM on a display surface IS parallel to each of the first direction DR1 and the second direction DR2, so as to face a third direction DR3. The display surface IS on which the images IM are displayed may correspond to a front surface of the display device DD.

According to some embodiments, a front surface (or an upper/top surface) and a rear surface (or a lower/bottom surface) of each member may be defined with respect to a direction in which the images IM are displayed. For example, a front surface may be a display surface at which images IM are displayed. The front surface and the rear surface may be opposite to each other along the third direction DR3, and a normal direction of each of the front surface and the rear surface may be parallel to the third direction DR3. As used herein the phrase "in a plan view" may refer to a view taken from the third direction DR3 facing toward the front surface of the display device DD.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions (for example, if the display device DD itself is rotated or changed in orientation).

The display surface IS of the display device DD may be divided into a display area DD-DA and a non-display area DD-NDA. The display area DD-DA may refer to an area in which the images IM are displayed. The user may visually perceive the images IM at the display area DD-DA, and the non-display area DD-NDA may be an area at which images IM are not displayed.

The non-display area DD-NDA is adjacent to the display area DD-DA (for example, outside a footprint or in a periphery of the display area DD-DA, in a plan view). The non-display area DD-NDA may have a given color (e.g., a set or predetermined color). The non-display area DD-NDA may surround the display area DD-DA. As such, a shape of the display area DD-DA may be defined substantially by the non-display area DD-NDA. However, this is illustrated as an example, and the display area DD-DA may be located adjacent to only one side of the display area DD-DA or may be omitted. The display device DD according to some embodiments of the present disclosure may include various embodiments and is not limited to any one embodiment.

The display device DD according to some embodiments of the present disclosure may sense an input TC (e.g., a touch input, for example, from a user's finger or a stylus) of the user, which is applied from the outside. The display device DD may sense the input TC of the user by sensing a change of one of a reflected light, a temperature, a pressure, an ultrasonic wave, and electromagnetism by the input TC of the user or a change of a combination thereof. According to some embodiments, the description will be given under the assumption that the input TC of the user is a touch input by the hand (e.g., a finger) of the user, which is made on the front surface of the display device DD, but embodiments according to the present disclosure are not limited thereto. For example, as described above, the input TC of the user may be provided in various types/manners (e.g., a stylus or other input device, etc.). Also, the display device DD may sense the user input TC applied to the side surface or the rear surface of the display device DD depending on a structure of the display device DD and is not limited to any one embodiment.

Also, the display device DD according to some embodiments of the present disclosure may sense an input that is made by an electronic pen. The electronic pen may refer to an input device that uses an apparatus such as a stylus pen, an electronic pen, or an active pen.

Figure 2:
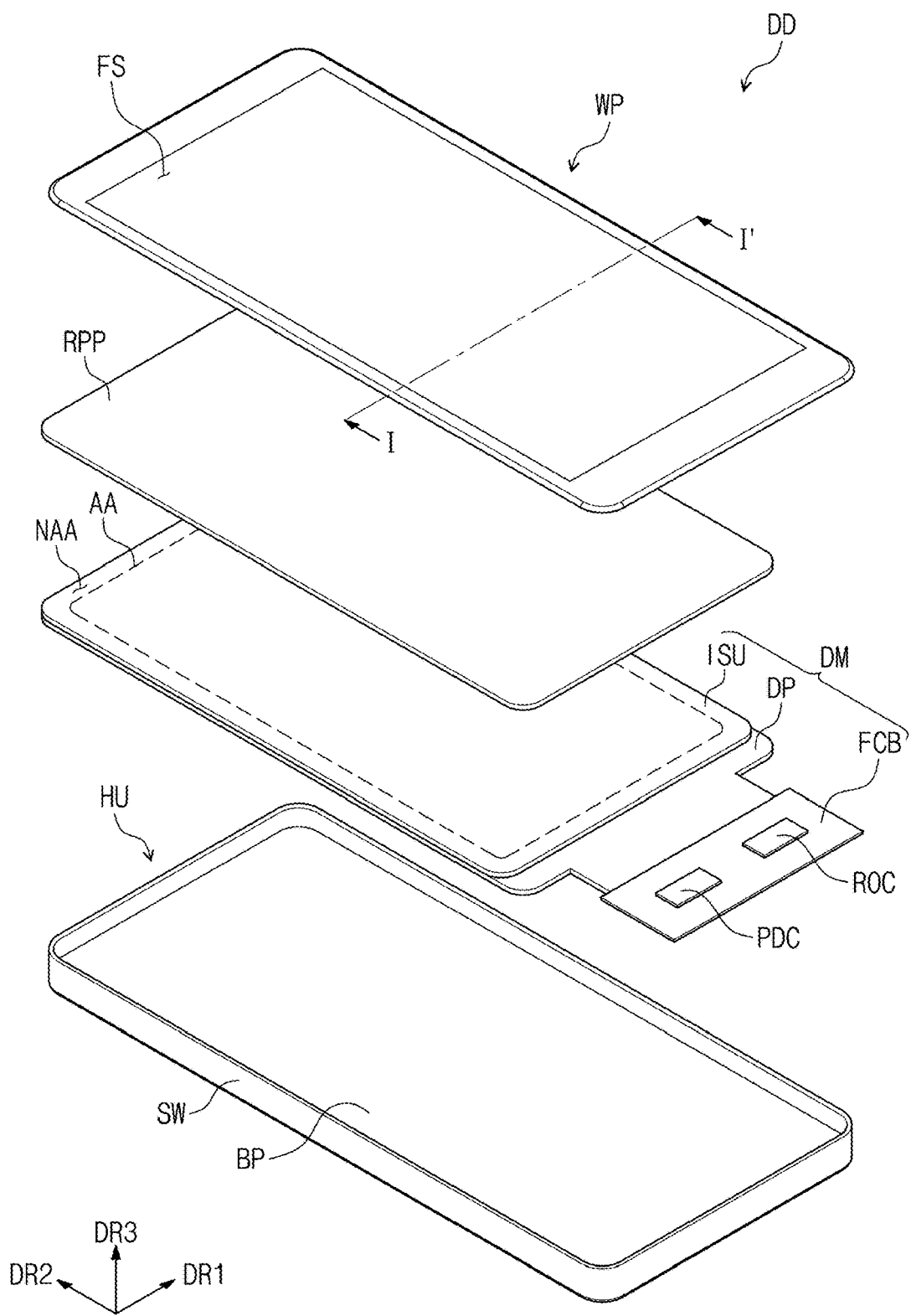
FIG. 2 is an exploded perspective view of a display device according to some embodiments of the present disclosure.

FIG. 2 is an exploded perspective view of a display device according to some embodiments of the present disclosure.

Referring to FIG. 2, the display device DD may include a window WP, an anti-reflector (or anti-reflector layer, or anti-reflection panel) RPP, a display module DM, and a housing HU. As illustrated in FIGS. 1 and 2, according to some embodiments, the window WP and the housing HU may be coupled to form the exterior of the display device DD.

The window WP protects an upper surface of a display panel DP. The window WP may include an optically transparent material. For example, the window WP may include a front surface FS including a transparent material that includes, for example, glass or plastic. The window WP may include a multi-layer structure or a single layer structure. For example, the window WP may include a plurality of plastic films bonded by an adhesive or may have a glass substrate and a plastic film bonded by an adhesive.

The anti-reflector RPP may be located under the window WP. The anti-reflector RPP decreases the reflectance of an external light incident from above the window WP. According to some embodiments of the present disclosure, the anti-reflector RPP may be omitted or may be embedded in the display module DM.

The display module DM may display the images IM and may sense the input TC (refer to FIG. 1) of the user. The display module DM may include the display panel DP, an input sensor ISU, and a printed circuit board FCB.

An active area AA and a peripheral area (or non-active area) NAA that respectively correspond to the display area DD-DA and the non-display area DD-NDA illustrated in FIG. 1 may be defined in the display panel DP. The images IM that are generated at the active area AA of the display panel DP may be visually perceived by the user from the outside through the window WP.

The input sensor ISU may sense the user input TC applied from the outside. The input sensor ISU may sense the user input TC that is provided on the window WP.

The display panel DP may be electrically connected with the printed circuit board FCB. According to some embodiments, a driver chip that generates signals for the operation of the display panel DP may be mounted in the display panel DP.

The printed circuit board FCB may include various kinds of driving circuits for driving the display panel DP and the input sensor ISU, a connector for supply a power, etc. According to some embodiments, the printed circuit board FCB may include a panel driving circuit PDC for driving the display panel DP and a readout circuit ROC for driving the input sensor ISU. The panel driving circuit PDC and the readout circuit ROC may be implemented with independent integrated circuits and may be mounted on the printed circuit board FCB. According to some embodiments, the panel driving circuit PDC and the readout circuit ROC may be implemented with one integrated circuit.

The housing HU includes a bottom part BP and a side wall SW. The side wall SW may extend from the bottom part BP. The housing HU may accommodate the display panel DP in an accommodation space defined by the bottom part BP and the side wall SW. The window WP may be coupled to the side wall SW of the housing HU. The side wall SW of the housing HU may support a periphery of the window WP.

The housing HU may include a material having relatively high rigidity. For example, the housing HU may include glass, plastic, or metal or may include a plurality of frames and/or plates that are formed of a combination thereof. The housing HU may stably protect the components of the display device DD accommodated in the inner space from an external impact.

Figure 3:
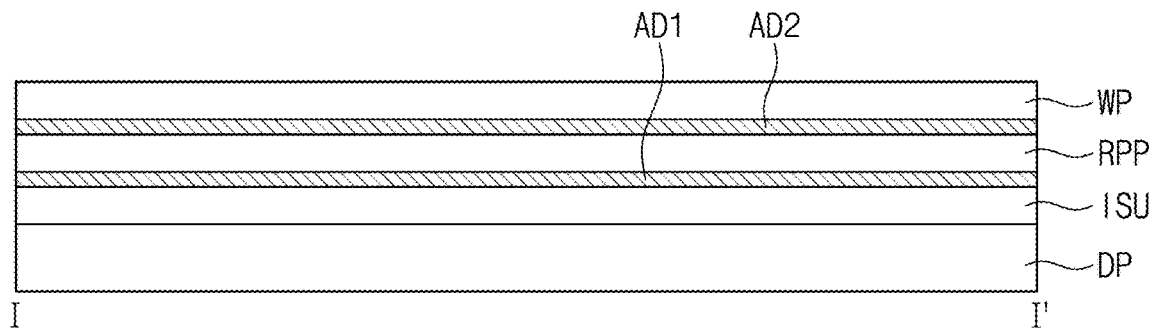
FIG. 3 is a cross-sectional view of a display device taken along the line I-I' of FIG. 2 according to some embodiments of the present disclosure.
Figure 3:
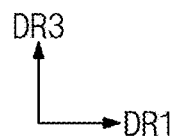

FIG. 3 is a cross-sectional view of the display device DD taken along the line I-I' of FIG. 2.

FIG. 3 shows the cross section of the display device DD defined by the first direction DR1 and the third direction DR3. In FIG. 3, the components of the display device DD are illustrated simply to describe a stacked relationship of the components.

According to some embodiments of the present disclosure, the display device DD may include the display panel DP, the input sensor ISU, the anti-reflector RPP, and the window WP. At least some of the display panel DP, the input sensor ISU, the anti-reflector RPP, and the window WP may be formed by a process continuous (or subsequent) to that of the others or may be coupled to each other through an adhesive member. For example, the input sensor ISU and the anti-reflector RPP may be coupled by an adhesive member AD1. The anti-reflector RPP and the window WP may be coupled by an adhesive member AD2.

The adhesive members AD1 an AD2 may be a transparent adhesive member such as a pressure sensitive adhesive film (PSA), an optically clear adhesive film (OCA), or an optically clear resin (OCR). An adhesive member to be described below may include a typical adhesive or a sticking agent. According to some embodiments of the present disclosure, the anti-reflector RPP and the window WP may be replaced with any other components or may be omitted.

In FIG. 3, the input sensor ISU formed through a process continuous (or subsequent) to that of the display panel DP from among the input sensor ISU, the anti-reflector RPP, and the window WP is directly located on the display panel DP. In the specification, the expression "a component B is directly located on a component A" may mean that a separate adhesive layer/adhesive member is not interposed between the component A and the component B. After the component A is formed, through the continuous process, the component B is formed on a base surface on which the component A is provided.

According to some embodiments, the anti-reflector RPP and the window WP are of a "panel" type, and the input sensor ISU is of a "layer" type. The "panel" type includes a base layer providing a base surface, for example, a synthetic resin film, a composite material film, a glass substrate, etc., but the "layer" type may not include the base layer. In other words, components of the "layer" type are located on a base surface that any other component provides. According to some embodiments of the present disclosure, the anti-reflector RPP and the window WP may be of the "layer" type.

The display panel DP generates images, and the input sensor ISU obtains coordinate information of an external input (e.g., a touch event). According to some embodiments, the display device DD may further include a protection member located on the lower surface (or rear surface) of the display panel DP. The protection member and the display panel DP may be coupled through an adhesive member.

The display panel DP according to some embodiments of the present disclosure may be a light-emitting display panel but embodiments according to the present disclosure are not particularly limited. For example, the display panel DP may be an organic light-emitting display panel or a quantum dot light-emitting display panel. The panels are distinguished based on a material forming a light-emitting element. An emission layer of the organic light-emitting display panel may include an organic light-emitting material. An emission layer of the quantum dot light-emitting display panel may include quantum dots and/or quantum rods. Below, the description will be given in the context of the display panel DP being an organic light-emitting display panel, but embodiments according to the present disclosure are not limited thereto.

The anti-reflector RPP decreases the reflectance of an external light incident from above the window WP. The anti-reflector RPP according to some embodiments of the present disclosure may include a retarder and a polarizer. The retarder may be of a film type or a liquid crystal coating type. The polarizer may also be of a film type or a liquid crystal coating type. The film type may include a stretch-type synthetic resin film, and the liquid crystal coating type may include liquid crystals arranged in a given direction. Each of the retarder and the polarizer may further include a protective film. The retarder and the polarizer themselves or the protective film may be defined as a base layer of the anti-reflection layer RPP.

The anti-reflector RPP according to some embodiments of the present disclosure may include color filters. The color filters have a given arrangement. The arrangement of the color filters may be determined in consideration of emission colors of pixels included in the display panel DP. The anti-reflector RPP may further include a black matrix adjacent to the color filters.

The anti-reflector RPP according to some embodiments of the present disclosure may include a destructive interference structure. For example, the destructive interference structure may include a first reflective layer and a second reflective layer that are located on different layers. A first reflected light and a second reflected light respectively reflected by the first reflective layer and the second reflective layer may cause the destructive interference, resulting in a decrease in reflectance of an external light.

The window WP according to some embodiments of the present disclosure may include a glass substrate and/or a synthetic resin film. The window WP is not limited to a single layer. The window WP may include two or more films bonded by an adhesive member. According to some embodiments, the window WP may further include a functional coating layer. The functional coating layer may include an anti-fingerprint layer, an anti-reflection layer, a hard coating layer, etc.

The input sensor ISU and the display panel DP will be described in more detail below.

Figure 4:
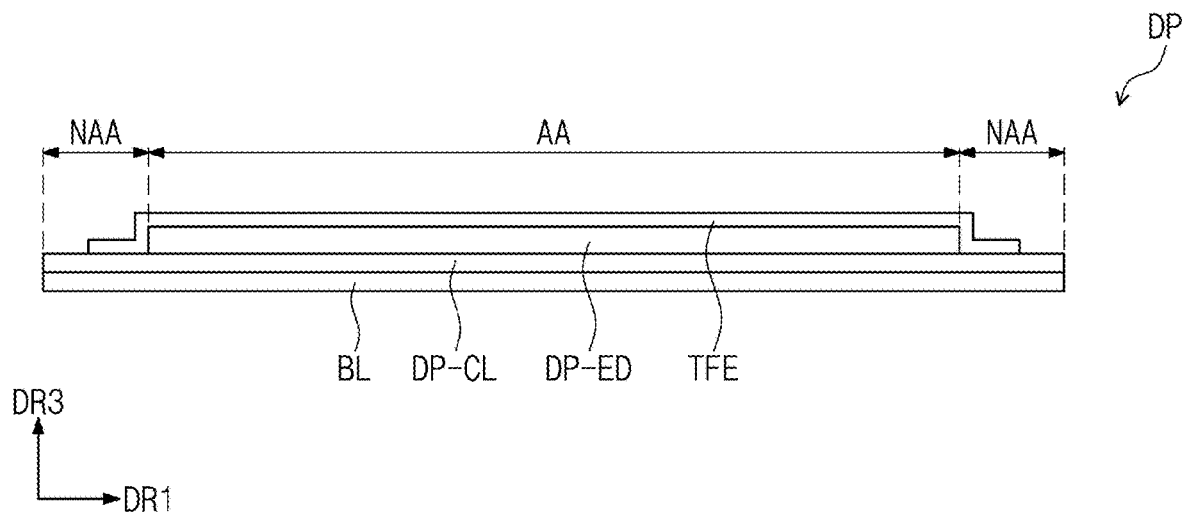
FIG. 4 is a cross-sectional view of a display panel illustrated in FIG. 3 according to some embodiments of the present disclosure.

FIG. 4 is a cross-sectional view of the display panel DP illustrated in FIG. 3.

As illustrated in FIG. 4, the display panel DP includes a base layer BL, a circuit element layer DP-CL located on the base layer BL, a light-emitting element layer DP-ED, and a thin film encapsulation layer TFE. The active area AA and the peripheral area (or non-active area) NAA that respectively correspond to the display area DD-DA and the non-display area DD-NDA illustrated in FIG. 1 may be defined in the display panel DP. In the specification, the expression "an area/portion corresponds to an area/portion" means that "the areas/portions overlap each other", but is not limited to the meaning that the areas/portions have the same area and/or the same shape.

The base layer BL may include at least one synthetic resin film. The base layer BL may include a glass substrate, a metal substrate, or an organic/inorganic composite material substrate.

The circuit element layer DP-CL is located on the base layer BL. The circuit element layer DP-CL includes at least one insulating layer and circuit elements. The insulating layer includes at least one inorganic layer and at least one organic layer. The circuit elements may constitute signal lines, pixel driving circuits, etc.

The light-emitting element layer DP-ED is located on the circuit element layer DP-CL. The light-emitting element layer DP-ED may include organic light-emitting diodes. The light-emitting element layer DP-ED may further include an organic film such as a pixel defining film.

The thin film encapsulation layer TFE may be located on the light-emitting element layer DP-ED to cover the light-emitting element layer DP-ED. The thin film encapsulation layer TFE may cover the entire active area AA. The thin film encapsulation layer TFE may cover a portion of the peripheral area NAA.

The thin film encapsulation layer TFE includes a plurality of thin films. Some of the thin films may be formed to improve optical efficiency, and the others thereof may be formed to protect the organic light-emitting diodes.

Figure 5:
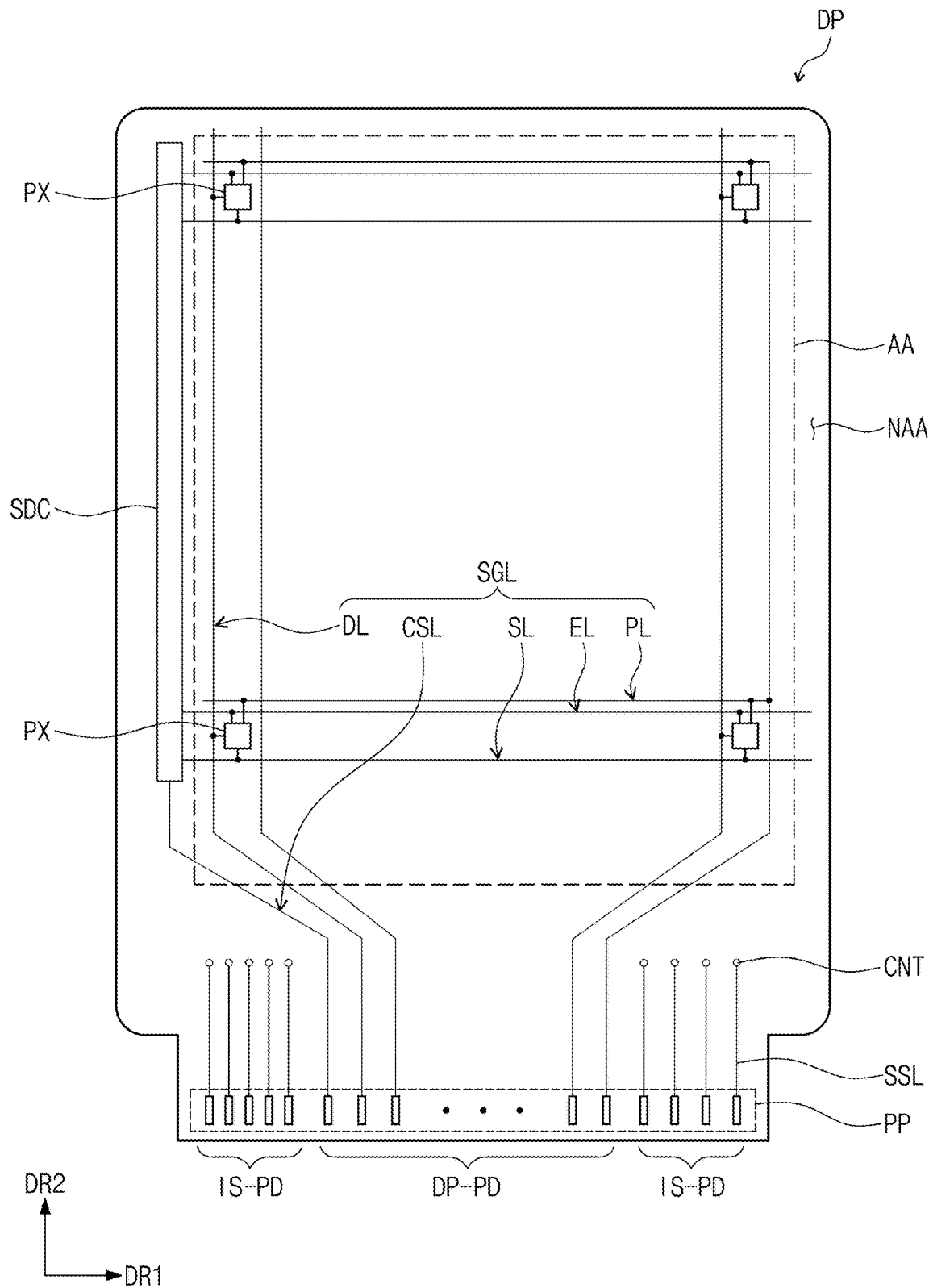
FIG. 5 is a plan view of a display panel according to some embodiments of the present disclosure.

FIG. 5 is a plan view of the display panel DP according to some embodiments of the present disclosure.

As illustrated in FIG. 5, the display panel DP may include a scan driving circuit SDC, a plurality of signal lines (hereinafter referred to as the "signal lines") SGL, a plurality of signal pads (hereinafter referred to as the "signal pads") DP-PD and IS-PD, and a plurality of pixels (hereinafter referred to as the "pixels") PX.

The scan driving circuit SDC generates a plurality of scan signals (hereinafter referred to as the "scan signals") and sequentially outputs the scan signals to a plurality of scan lines (hereinafter referred to as the "scan lines") SL to be described later. The scan driving circuit SDC may output any other control signals, as well as the scan signals, to the pixels PX.

The scan driving circuit SDC may include a plurality of transistors formed through the same process as transistors in the pixels PX.

Signal lines SGL include the scan lines SL, data lines DL, a power line PL, emission control lines EL, and a control signal line CSL. The scan lines SL, the data lines DL, and the emission control lines EL are connected with the pixels PX. The power line PL is connected in common with the pixels PX. The control signal line CSL may provide the control signals to the scan driving circuit SDC. The power line PL may provide a voltage necessary for the operation of the pixels PX. The power line PL may include a plurality of lines that provide different voltages.

According to some embodiments, the signal lines SGL may further include auxiliary lines SSL. According to some embodiments of the present disclosure, the auxiliary lines SSL may be omitted. The auxiliary lines SSL are respectively connected with contact holes CNT. The auxiliary lines SSL may be electrically connected with signal lines of the input sensor ISU (refer to FIG. 6) to be described later through the contact holes CNT.

The display panel DP may include a pad area PP. Signal pads DP-PD and IS-PD may be located in the pad area PP of the display panel DP. The signal pads DP-PD and IS-PD may include the first signal pads DP-PD connected with the data lines DL, the power line PL, and the control signal line CSL and the second signal pads IS-PD connected with the auxiliary lines SSL. The first signal pads DP-PD and the second signal pads IS-PD are located in the pad area PP defined in a partial area of the peripheral area NAA, so as to be adjacent to each other. The stacked structure or constituent material of the signal pads DP-PD and IS-PD may be formed through the same process without separation.

The active area AA may be defined as an area in which the pixels PX are located. A plurality of electronic elements are located in the active area AA. In each of the pixels PX, the electronic elements include an organic light-emitting diode and a pixel driving circuit connected therewith. The scan driving circuit SDC, the signal lines SGL, the signal pads DP-PD and IS-PD, and the pixel driving circuit may be included in the circuit element layer DP-CL illustrated in FIG. 4.

According to some embodiments, each of the pixels PX may include a plurality of transistors, a capacitor, and an organic light-emitting diode. The pixels PX emit the light in response to signals received through the scan lines SL, the data lines DL, the emission control lines EL, and the power line PL.

The signal pads DP-PD and IS-PD of the display panel DP may be electrically connected with the printed circuit board FCB illustrated in FIG. 2.

A portion of the display panel DP illustrated in FIG. 5 may be bent. According to some embodiments, a portion of the peripheral area NAA of the display panel DP may be bent, for example, may be bent around a bending axis parallel to the first direction DR1. The bending axis may be defined such that some of the data lines DL and some of the auxiliary lines SSL overlap each other (e.g., when the portion of the peripheral area NAA is bent).

Figure 6:
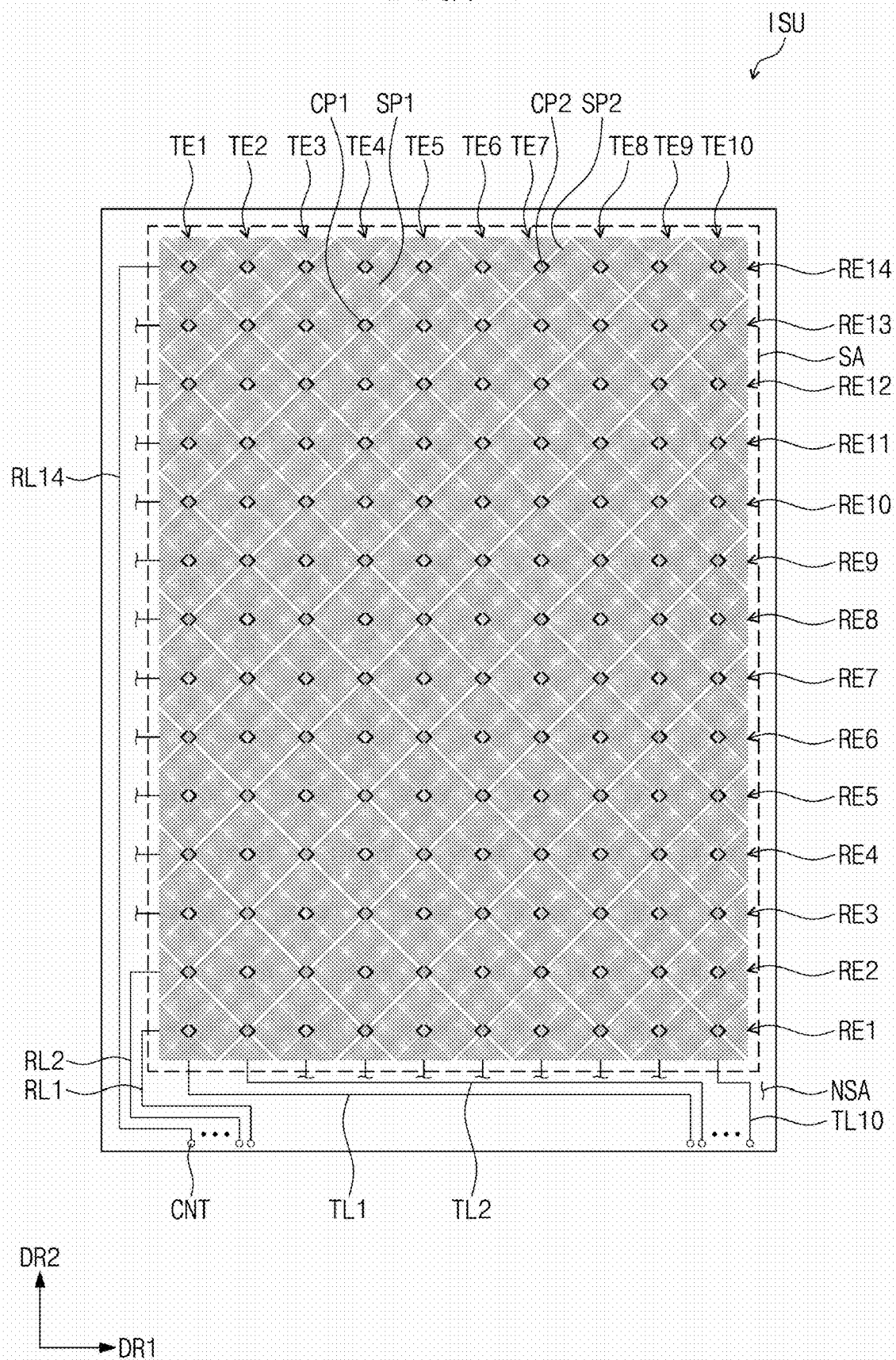
FIG. 6 is a plan view illustrating a configuration of an input sensor according to some embodiments of the present disclosure.

FIG. 6 is a plan view illustrating a configuration of the input sensor ISU according to some embodiments of the present disclosure. The readout circuit ROC illustrated in FIG. 2 and the input sensor ISU illustrated in FIG. 6 may constitute an input sensing device.

Referring to FIG. 6, the input sensor ISU may include a sensing area SA and a non-sensing area NSA. The sensing area SA may be an area that is activated according to an electrical signal. For example, the sensing area SA may be an area at which an input is sensed. The non-sensing area NSA may surround the sensing area SA. The sensing area SA may correspond to the active area AA of FIG. 5, and the non-sensing area NSA may correspond to the peripheral area NAA of FIG. 5.

The input sensor ISU includes transmission electrodes TE1 to TE10 and reception electrodes RE1 to RE14. The transmission electrodes TE1 to TE10 and the reception electrodes RE1 to RE14 are located in the sensing area SA. The transmission electrodes TE1 to TE10 and the reception electrodes RE1 to RE14 are electrically insulated from each other and cross each other in the sensing area SA. According to some embodiments of the present disclosure, the input sensor ISU includes the first to tenth transmission electrodes TE1 to TE10 and the first to fourteenth reception electrodes RE1 to RE14, but embodiments according to the present disclosure are not limited thereto. The number of transmission electrodes and the number of reception electrodes may be variously changed. According to some embodiments in which the number of reception electrodes is more than the number of transmission electrodes is illustrated in FIG. 6; however, according to some embodiments, the number of transmission electrodes may be more than or equal to the number of reception electrodes.

In the specification, to clearly distinguish between the electrodes TE1 to TE10 and the electrodes RE1 to RE14, the electrodes TE1 to TE10 are named "transmission electrodes", and the electrodes RE1 to RE14 are named "reception electrodes, but functions of the electrodes are not limited to the names. Depending on an operating period, the transmission electrodes TE1 to TE10 may operate as not only the transmission electrodes but also the reception electrodes, and the reception electrodes RE1 to RE14 may operate as not only the reception electrodes but also the transmission electrodes.

Each of the first to tenth transmission electrodes TE1 to TE10 extends in the second direction DR2, and the first to tenth transmission electrodes TE1 to TE10 are arranged to be spaced from each other in the first direction DR1. The first to tenth transmission electrodes TE1 to TE10 may be electrically separated from each other. The first to tenth transmission electrodes TE1 to TE10 include first sensing patterns SP1 arranged to be spaced from each other in the first direction DR1 and first connecting patterns CP1 electrically connecting the first sensing patterns SP1. The first sensing patterns SP1 and the first connecting patterns CP1 are located on different layers and are not integrally formed.

The first to fourteenth reception electrodes RE1 to RE14 extend in the second direction DR2. The first to fourteenth reception electrodes RE1 to RE14 may be arranged to be spaced from each other in the second direction DR2. The first to fourteenth reception electrodes RE1 to RE14 may be electrically separated from each other. The first to fourteenth reception electrodes RE1 to RE14 may be arranged to intersect the first to tenth transmission electrodes TE1 to TE10 and may be electrically insulated from the first to tenth transmission electrodes TE1 to TE10. The first to fourteenth reception electrodes RE1 to RE14 include second sensing patterns SP2 spaced from each other in the first direction DR1 and second connecting patterns CP2 electrically connecting the second sensing patterns SP2. The second sensing patterns SP2 and the second connecting patterns CP2 may be integrally formed.

Embodiments in which the first sensing patterns SP1 and the second sensing patterns SP2 are in the shape of a rhombus are illustrated in FIG. 6 as an example, but embodiments according to the present disclosure are not limited thereto. The first sensing patterns SP1 and the second sensing patterns SP2 may have different polygonal shapes.

Each of the first to tenth transmission electrodes TE1 to TE10 and the first to fourteenth reception electrodes RE1 to RE14 may have a mesh shape. Because each of the first to tenth transmission electrodes TE1 to TE10 and the first to fourteenth reception electrodes RE1 to RE14 has a mesh shape, parasitic capacitances that are formed with the electrodes (e.g., a second electrode CE (refer to FIG. 7)) of the display panel DP (refer to FIG. 5) may be reduced.

The input sensor ISU may obtain location information about an external input through a change in the mutual capacitance between the first to tenth transmission electrodes TE1 to TE10 and the first to fourteenth reception electrodes RE1 to RE14.

The input sensor ISU may further include first to tenth transmission lines TL1 to TL10 and first to fourteenth reception lines RL1 to RL14. The first to tenth transmission lines TL1 to TL10 and the first to fourteenth reception lines RL1 to RL14 may be located in the non-sensing area NSA. The first to tenth transmission lines TL1 to TL10 are electrically connected with first sides of the first to tenth transmission electrodes TE1 to TE10, and the first to fourteenth reception lines RL1 to RL14 are electrically connected to first sides of the first to fourteenth reception electrodes RE1 to RE14. However, embodiments according to the present disclosure are not limited thereto. According to some embodiments, the input sensor ISU may further include transmission lines electrically connected to second sides of the first to tenth transmission electrodes TE1 to TE10, which face away from the first sides.

The input sensor ISU is electrically connected to the readout circuit ROC (refer to FIG. 2) through the first to tenth transmission lines TL1 to TL10 and the first to fourteenth reception lines RL1 to RL14. The readout circuit ROC may control the operation of the input sensor ISU. For example, the readout circuit ROC may control the operation of the input sensor ISU in first to fourth operating periods.

In the first to fourth operating periods, the readout circuit ROC may send transmission signals to the first to tenth transmission lines TL1 to TL10 and/or the first to fourteenth reception lines RL1 to RL14 and may receive reception signals from the first to tenth transmission lines TL1 to TL10 and/or the first to fourteenth reception lines RL1 to RL14.

Operations of the readout circuit ROC and the input sensor ISU in each of the first to fourth operating periods will be described in more detail later.

Figure 7:
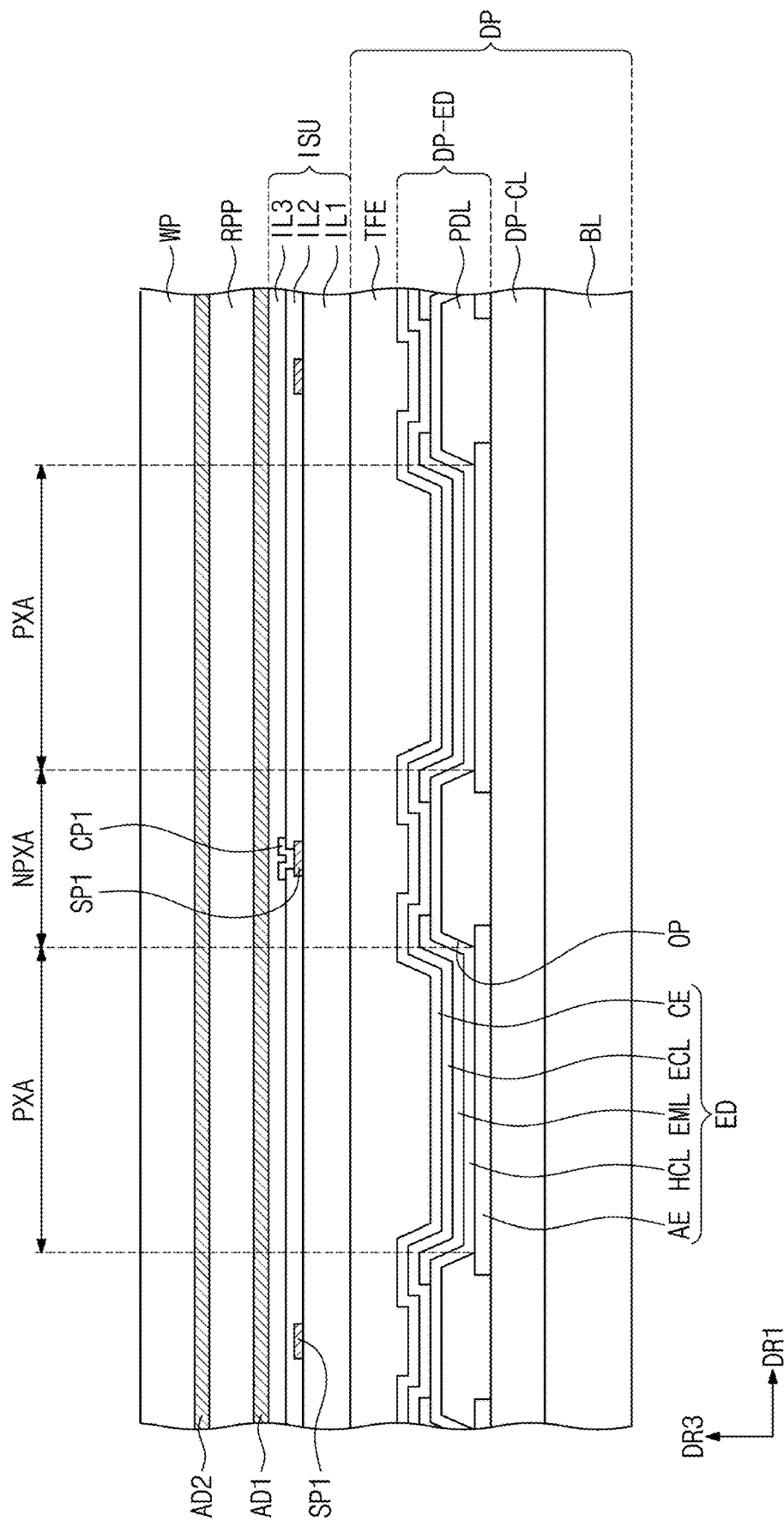
FIG. 7 is a cross-sectional view of a display device according to some embodiments of the present disclosure.

FIG. 7 is a cross-sectional view of a display device according to some embodiments of the present disclosure.

As illustrated in FIG. 7, the display panel DP includes the base layer BL, the circuit element layer DP-CL located on the base layer BL, the light-emitting element layer DP-ED, and the thin film encapsulation layer TFE. According to some embodiments, the display panel DP may further include functional layers such as an anti-reflection layer and a refractive index control layer.

The base layer BL may include a synthetic resin layer. The synthetic resin layer is formed on a substrate that is used upon manufacturing the display panel DP. Afterwards, a conductive layer and an insulating layer may be formed on the synthetic resin layer. When the substrate is removed, the synthetic resin layer corresponds to the base layer BL. The synthetic resin layer may be, for example, a polyimide-based resin layer, and the material thereof is not particularly limited. According to some embodiments, the base layer BL may include a glass substrate, a metal substrate, an organic/inorganic composite material substrate, etc.

The circuit element layer DP-CL includes at least one insulating layer and a circuit element. Below, the insulating layer included in the circuit element layer DP-CL is referred to as an "intermediate insulating layer". The intermediate insulating layer includes at least one intermediate inorganic film and at least one intermediate organic film. The circuit element includes a signal line, a pixel driving circuit, etc. The circuit element layer DP-CL may be formed through the process of forming an insulating layer, a semiconductor layer, and a conductive layer by using coating and deposition processes and the process of patterning the insulating layer, the semiconductor layer, and the conductive layer by using by using a photolithography process.

The light-emitting element layer DP-ED may include a pixel defining layer PDL and an organic light-emitting diode ED. The pixel defining layer PDL may include an organic material. A first electrode AE is located on the circuit element layer DP-CL. The pixel defining layer PDL is formed on the first electrode AE. An opening OP is defined in the pixel defining layer PDL. The opening OP of the pixel defining layer PDL exposes at least a portion of the first electrode AE. According to some embodiments of the present disclosure, the pixel defining layer PDL may be omitted.

A hole control layer HCL may be located on the first electrode AE. An emission layer EML is located on the hole control layer HCL. The emission layer EML may be located in an area corresponding to the opening OP. That is, the emission layer EML may be independently formed for each of the pixels PX (refer to FIG. 5). The emission layer EML may include an organic material and/or an inorganic material. The emission layer EML may generate a light of a given color (e.g., a set or predetermined color).

An electron control layer ECL is located on the emission layer EML. The second electrode CE is located on the electron control layer ECL. The second electrode CE may be located in the pixels PX in common.

The thin film encapsulation layer TFE is located on the second electrode CE. The thin film encapsulation layer TFE seals the light-emitting element layer DP-ED. The thin film encapsulation layer TFE includes at least one insulating layer. The thin film encapsulation layer TFE according to some embodiments of the present disclosure may include at least one inorganic layer (hereinafter referred to as an "encapsulation inorganic layer"). The thin film encapsulation layer TFE according to some embodiments of the present disclosure may include at least one organic layer (hereinafter referred to as an "encapsulation organic layer") and at least one encapsulation inorganic layer.

The encapsulation inorganic layer protects the light-emitting element layer DP-ED from moisture/oxygen, and the encapsulation organic layer protects the light-emitting element layer DP-ED from a foreign material such as a dust particle. The encapsulation inorganic layer may include a silicon nitride layer, a silicon oxynitride layer, a silicon oxide layer, a titanium oxide layer, an aluminum oxide layer, etc. but is not particularly limited. The encapsulation organic layer may include an acryl-based organic layer and is not particularly limited.

The input sensor ISU includes a base layer IL1, first and second conductive layers located thereon, and first and second insulating layers IL2 and IL3. The base layer IL1 may include an inorganic material and may include, for example, a silicon nitride layer. An inorganic film located on the uppermost side of the thin film encapsulation layer TFE may also include silicon nitride, and the silicon nitride layer of the thin film encapsulation layer TFE and the base layer IL1 may be formed under different deposition conditions.

The first conductive layer is located on the base layer IL1. The first conductive layer may include the first sensing pattern SP1, the second sensing pattern SP2, and the second connecting pattern CP2. The second conductive layer is located on the first conductive layer. The second conductive layer may include the first connecting pattern CP1. The first insulating layer IL2 is located between the first conductive layer and the second conductive layer. The first conductive layer and the second conductive layer are separated and spaced from other by the first insulating layer IL2, when viewed in a cross-sectional view. A contact hole for partially exposing the first sensing pattern SP1 is provided in the first insulating layer IL2, and the first connecting pattern CP1 may be connected with the first sensing pattern SP1 through the contact hole. The second insulating layer IL3 is located on the first insulating layer IL2. The second insulating layer IL3 may cover the second conductive layer. The second insulating layer IL3 protects the second conductive layer from an external environment.

Mesh lines of the first sensing pattern SP1 and the second sensing pattern SP2 may define a plurality of mesh holes. The mesh lines may have a three-layer structure of titanium/aluminum/titanium.

In the display device according to some embodiments of the present disclosure, the input sensor ISU may be directly located on the display panel DP. In the specification, the expression "directly located" means that an adhesive layer is not located between the input sensor ISU and the display panel DP. That is, the input sensor ISU may be formed on the display panel DP through a continuous process. In this case, the input sensor ISU may be expressed as an input sensing layer.

A portion where the first electrode AE and the emission layer EML are located may be referred to as a "pixel area PXA". The pixel areas PXA may be spaced from each other in the first direction DR1 and the second direction DR2 (refer to FIG. 5). A non-pixel area NPXA is located between the pixel areas PXA and may surround the pixel areas PXA.

The anti-reflector RPP may be located on an upper surface of the input sensor ISU. As an example of the present disclosure, the anti-reflector RPP may include a polarizing film. The anti-reflector RPP may further include a protective layer and a functional layer in addition to the polarizing film; however, only the polarizing layer is illustrated below for convenience of description. An adhesive member AD1 may be located between the anti-reflector RPP and the input sensor ISU. Accordingly, the anti-reflector RPP may be coupled to the input sensor ISU by the adhesive member AD1. The window WP may be coupled to the anti-reflector RPP through an adhesive member AD2.

Returning to FIG. 6, the input sensor ISU may be a capacitive touch sensor. For example, one of the first to tenth transmission electrodes TE1 to TE10 and the first to fourteenth reception electrodes RE1 to RE14 receives a transmit signal, and another thereof outputs a change in capacity between the first to tenth transmission electrodes TE1 to TE10 and the first to fourteenth reception electrodes RE1 to RE14 as a sensing signal. For example, when the first transmission electrode TE1 receives a transmit signal (or a driving signal), the first transmission electrode TE1 is capacitively coupled to the first to fourteenth reception electrodes RE1 to RE14. When a part of the user's body (e.g., a finger, or alternatively an external device such as a stylus) is positioned on a specific reception electrode (e.g., the first reception electrode RE1) among the first to fourteenth reception electrodes RE1 to RE14 capacitively coupled, the capacity between the first transmission electrode TE1 and the first reception electrode RE1 is changed. The readout circuit ROC (refer to FIG. 2) may calculate coordinate information of the user's touch position by detecting the changed capacity of the sensing signal received from the first reception line RL1 connected with the first reception electrode RE1.

Figure 8:
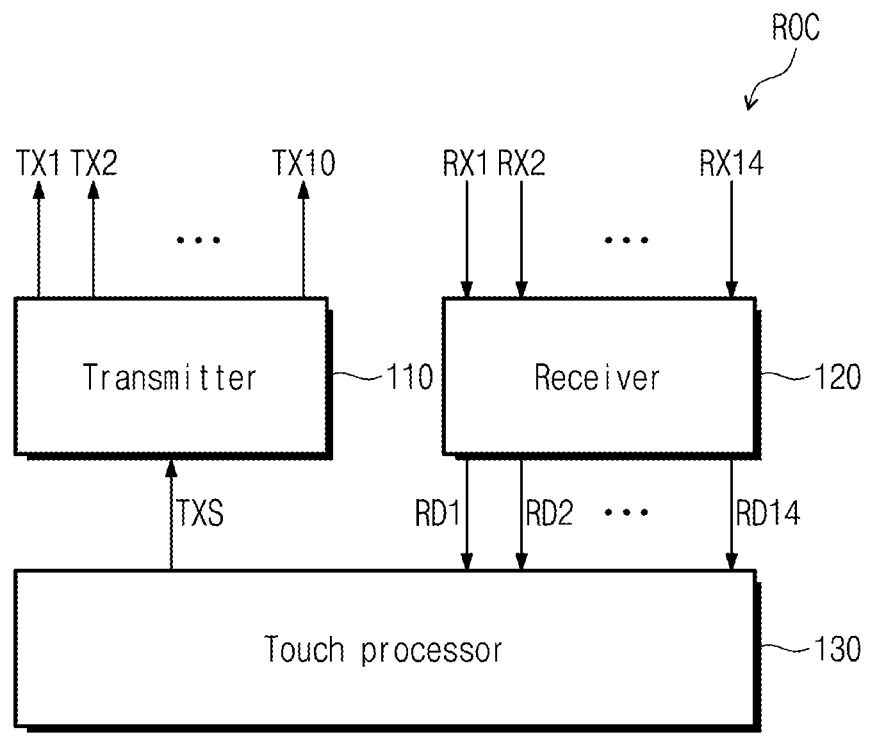
FIG. 8 is a block diagram illustrating a circuit configuration of a readout circuit according to some embodiments of the present disclosure.

FIG. 8 is a block diagram illustrating a circuit configuration of the readout circuit ROC according to some embodiments of the present disclosure.

Referring to FIG. 8, the readout circuit ROC includes a transmitter 110, a receiver 120, and a touch processor 130.

The touch processor 130 may control operations of the transmitter 110 and the receiver 120.

The touch processor 130 provides an output signal TXS to the transmitter 110.

The transmitter 110 converts the output signal TXS provided from the touch processor 130 into first to tenth transmit signals TX1 to TX10. The first to tenth transmit signals TX1 to TX10 may be provided to the first to tenth transmission lines TL1 to TL10 of the input sensor ISU illustrated in FIG. 6. According to some embodiments, each of the first to tenth transmit signals TX1 to TX10 output from the transmitter 110 may be a sinusoidal signal.

The receiver 120 receives first to fourteenth receive signals RX1 to RX14 from the first to fourteenth reception lines RL1 to RL14 and output first to fourteenth sensing signals RD1 to RD14.

The touch processor 130 may calculates coordinate information corresponding the user input TC (refer to FIG. 1), based on the output signal TXS provided to the transmitter 110 and the first to fourteenth sensing signals RD1 to RD14 received from the receiver 120.

Figure 9:
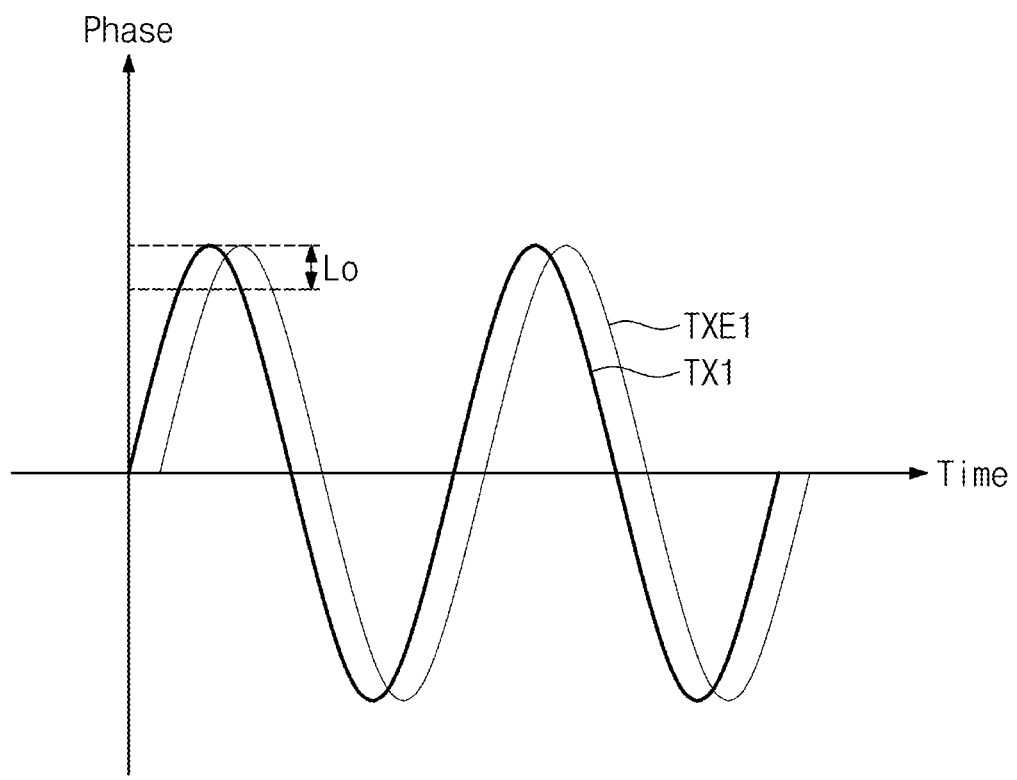
FIG. 9 is a diagram illustrating an example of a transmit signal according to some embodiments of the present disclosure.

FIG. 9 is a diagram illustrating an example of a transmit signal.

Referring to FIGS. 6, 8, and 9, the first transmit signal TX1 output from the transmitter 110 may be provided to the first transmission electrode TE1 through the first transmission line TL1. According to some embodiments, the first transmit signal TX1 output from the transmitter 110 may be a sinusoidal signal.

Due to an RC delay by a resistance component and a capacitance component of the first transmission line TL1 and the first transmission electrode TE1, there may be a difference (e.g., a set or predetermined difference), that is, a phase delay between the first transmit signal TX1 output from the transmitter 110 and a first electrode transmit signal TXE1 that the first transmission electrode TE1 receives.

Loss Lo that is caused by the phase delay between the first transmit signal TX1 and the first electrode transmit signal TXE1 may also be applied to signals of the first to fourteenth reception lines RL1 to RL14 that the receiver 120 receives.

Only the first transmit signal TX1 output from the transmitter 110 is illustrated in FIG. 9; however, as in the first transmit signal TX1, the second to tenth transmit signals TX2 to TX10 may also experience the phase delay due to the RC delay.

Figure 10:
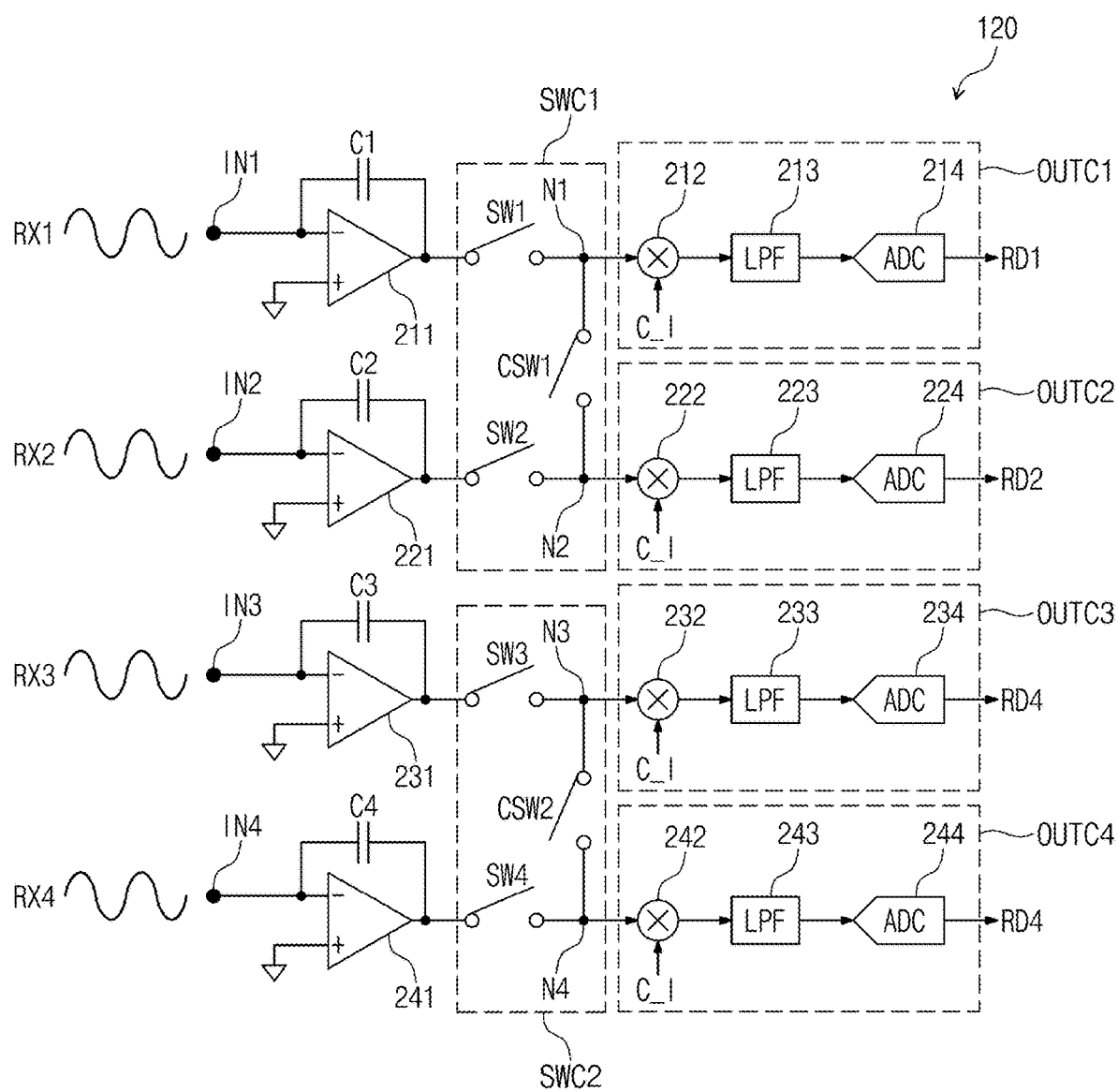
FIG. 10 is a diagram illustrating a partial configuration of a receiver according to some embodiments of the present disclosure.

FIG. 10 is a diagram illustrating a partial configuration of a receiver.

Referring to FIG. 10, the receiver 120 includes operational amplifiers 211, 221, 231, and 241, capacitors C1, C2, C3, and C4, switching circuits SWC1 and SWC2, and first to fourth output circuits OUTC1, OUTC2, OUTC3, and OUTC4. The first to fourth receive signals RX1, RX2, RX3, and RX4 may be respectively input to input terminals IN1, IN2, IN3, and IN4.

When each of the first to tenth transmit signals TX1 to TX10 is a sinusoidal signal, each of the first to fourth receive signals RX1, RX2, RX3, and RX4 may be a sinusoidal signal.

The operational amplifier 211 includes a first input terminal connected with the input terminal IN1, a second input terminal connected with a ground voltage, and an output terminal. The capacitor C1 is connected between the first input terminal and the output terminal of the operational amplifier 211.

The operational amplifier 221 includes a first input terminal connected with the input terminal IN2, a second input terminal connected with the ground voltage, and an output terminal. The capacitor C2 is connected between the first input terminal and the output terminal of the operational amplifier 221.

The operational amplifier 231 includes a first input terminal connected with the input terminal IN3, a second input terminal connected with the ground voltage, and an output terminal. The capacitor C3 is connected between the first input terminal and the output terminal of the operational amplifier 231.

The operational amplifier 241 includes a first input terminal connected with the input terminal IN4, a second input terminal connected with the ground voltage, and an output terminal. The capacitor C4 is connected between the first input terminal and the output terminal of the operational amplifier 241.

The switching circuit SWC1 includes switches SW1 and SW2 and a coupling switch CSW1. The switch SW1 is connected between the output terminal of the operational amplifier 211 and a first node N1. The switch SW2 is connected between the output terminal of the operational amplifier 221 and a second node N2. The coupling switch CSW1 is connected between the first node N1 and the second node N2.

The switching circuit SWC2 includes switches SW3 and SW4 and a coupling switch CSW2. The switch SW3 is connected between the output terminal of the operational amplifier 231 and a third node N3. The switch SW4 is connected between the output terminal of the operational amplifier 241 and a fourth node N4. The coupling switch CSW2 is connected between the third node N3 and the fourth node N4.

The first output circuit OUTC1 includes a mixer 212, a filter 213, and an analog-to-digital converter 214. The mixer 212 mixes and outputs a signal of the first node N1 and a first carrier (or an in-phase carrier) C_I. The filter 213 may filter and output an output of the mixer 212. According to some embodiments, the filter 213 may be a low pass filter. The analog-to-digital converter 214 converts an analog signal output from the filter 213 into a digital signal so as to be output as the first sensing signal RD1.

The second output circuit OUTC2 includes a mixer 222, a filter 223, and an analog-to-digital converter 224. The mixer 222 mixes and outputs a signal of the second node N2 and the first carrier C_I. The filter 223 may filter and output an output of the mixer 222. According to some embodiments, the filter 223 may be a low pass filter. The analog-to-digital converter 224 converts an analog signal output from the filter 223 into a digital signal so as to be output as the second sensing signal RD2.

The third output circuit OUTC3 includes a mixer 232, a filter 233, and an analog-to-digital converter 234. The mixer 232 mixes and outputs a signal of the third node N3 and the first carrier C_I. The filter 233 may filter and output an output of the mixer 232. According to some embodiments, the filter 233 may be a low pass filter. The analog-to-digital converter 234 converts an analog signal output from the filter 233 into a digital signal so as to be output as the third sensing signal RD3.

The fourth output circuit OUTC4 includes a mixer 242, a filter 243, and an analog-to-digital converter 244. The mixer 242 mixes and outputs a signal of the fourth node N4 and the first carrier C_I. The filter 243 may filter and output an output of the mixer 242. According to some embodiments, the filter 243 may be a low pass filter. The analog-to-digital converter 244 converts an analog signal output from the filter 243 into a digital signal so as to be output as the fourth sensing signal RD4.

According to some embodiments, the switches SW1, SW2, SW3, and SW4 and the coupling switches CSW1 and CSW2 may operate in response to switching signals provided from the touch processor 130 illustrated in FIG. 8.

According to some embodiments, the switches SW1, SW2, SW3, and SW4 may be directly connected with the input terminals IN1, IN2, IN3, and IN4 instead of the output terminals of the operational amplifiers 211, 221, 231, and 241.

The first to fourth sensing signals RD1, RD2, RD3, and RD4 output from the first to fourth output circuits OUTC1, OUTC2, OUTC3, and OUTC4 may be provided to the touch processor 130 illustrated in FIG. 8.

The receiver 120 illustrated in FIG. 10 receives the first to fourth receive signals RX1, RX2, RX3, and RX4 and outputs the first to fourth sensing signals RD1, RD2, RD3, RD4, but embodiments according to the present disclosure are not limited thereto. The number of receive signals that the receiver 120 receives and the number of sensing signals that the receiver 120 outputs may be variously changed.

An example in which the first carrier C_I is provided to each of the mixers 212, 222, 232, and 242 is illustrated in FIG. 10, but a second carrier (or a quadrature phase carrier) different from the first carrier C_I may be provided to each of the mixers 212, 222, 232, and 242.

Figure 11:
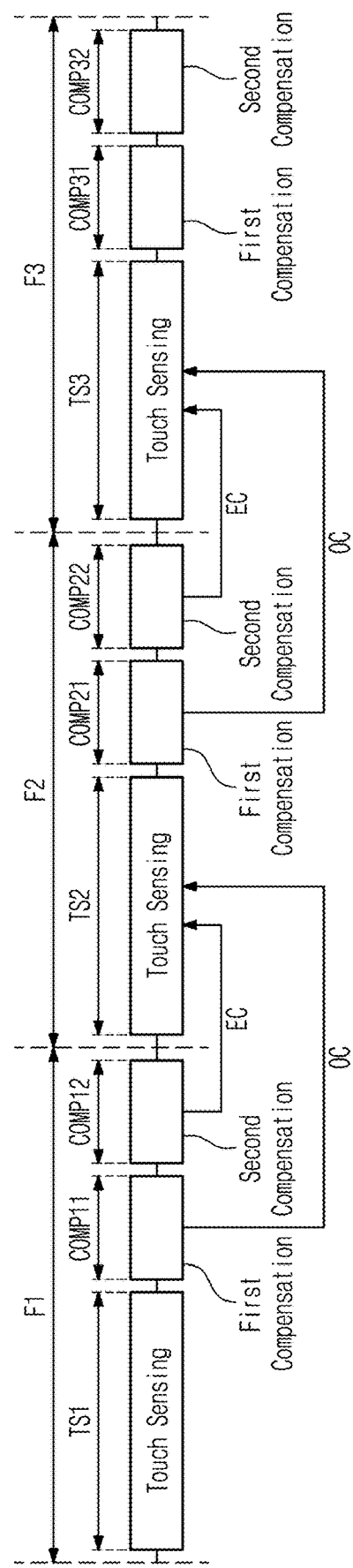
FIG. 11 is a diagram for describing an operation of a receiver according to some embodiments of the present disclosure.

FIG. 11 is a diagram for describing an operation of a receiver according to some embodiments.

Referring to FIG. 11, a first frame F1 may include a touch sensing period TS1, a first compensation period COMP11, and a second compensation period COMP12.

During a second frame F2, the receiver 120 may include a touch sensing period TS2, a first compensation period COMP21, and a second compensation period COMP22.

During a third frame F3, the receiver 120 may include a touch sensing period TS3, a first compensation period COMP31, and a second compensation period COMP32.

Figure 12A:
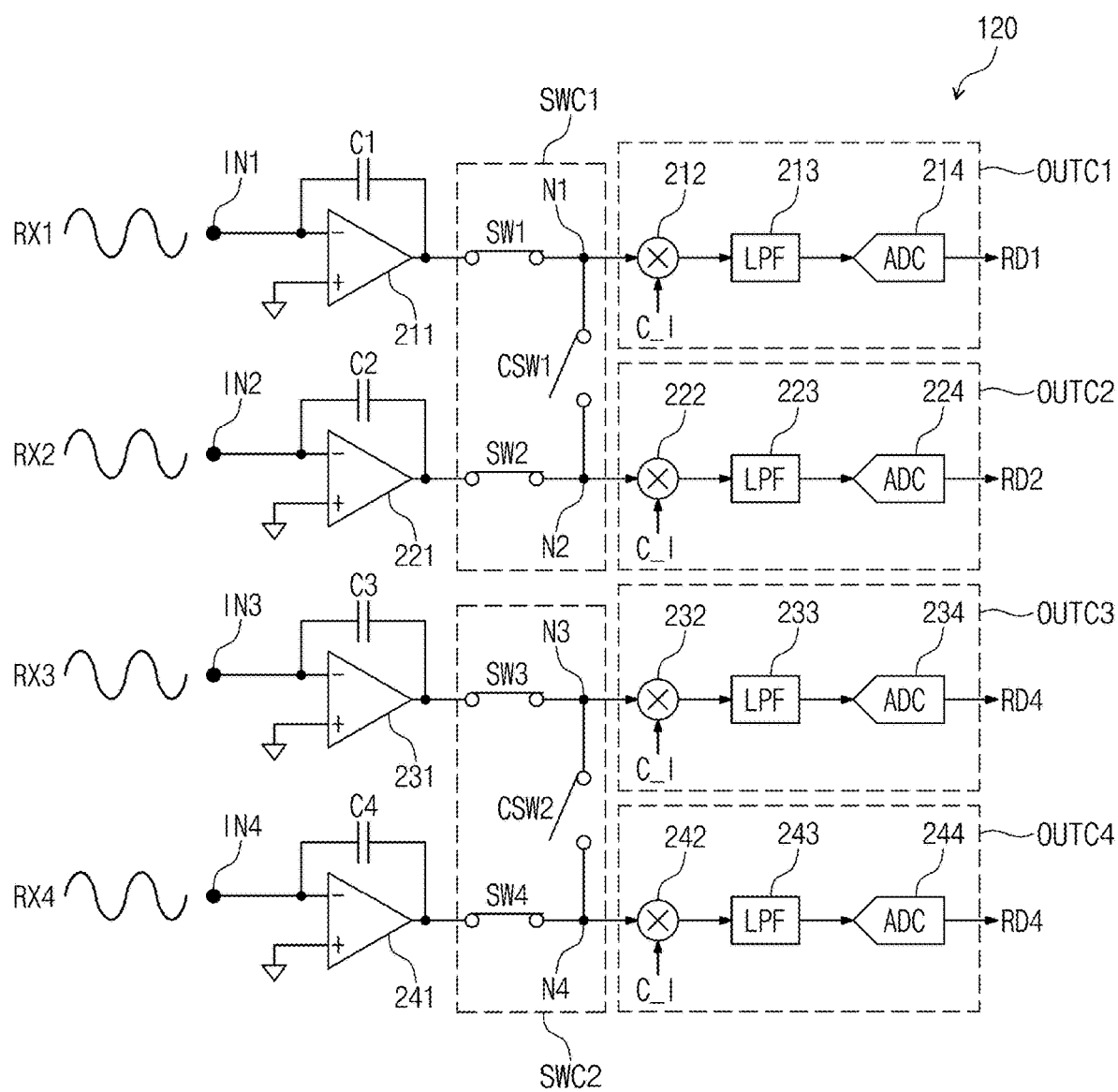
FIG. 12A is a diagram for describing an operation of a receiver during a touch sensing period according to some embodiments of the present disclosure.

FIG. 12A is a diagram for describing an operation of the receiver 120 during a touch sensing period.

Referring to FIGS. 11 and 12A, in each of the touch sensing period TS1 of the first frame F1, the touch sensing period TS2 of the second frame F2, and the touch sensing period TS3 of the third frame F3, the receiver 120 outputs the first to fourth sensing signals RD1, RD2, RD3, and RD4 corresponding to the first to fourth receive signals RX1, RX2, RX3, and RX4.

In each of the touch sensing period TS1, the touch sensing period TS2, and the touch sensing period TS3, the switches SW1, SW2, SW3, and SW4 are in an on state, and the coupling switches CSW1 and CSW2 are in an off state.

Each of the mixers 212, 222, 232, and 242 receives the first carrier C_I.

The first to fourth receive signals RX1, RX2, RX3, and RX4 input to the input terminals IN1, IN2, IN3, and IN4 may be output as the first to fourth sensing signals RD1, RD2, RD3, and RD4 through the operational amplifiers 211, 221, 231, and 241, the switches SW1, SW2, SW3, and SW4, and the first to fourth output circuits OUTC1, OUTC2, OUTC3, and OUTC4.

Figure 12B:
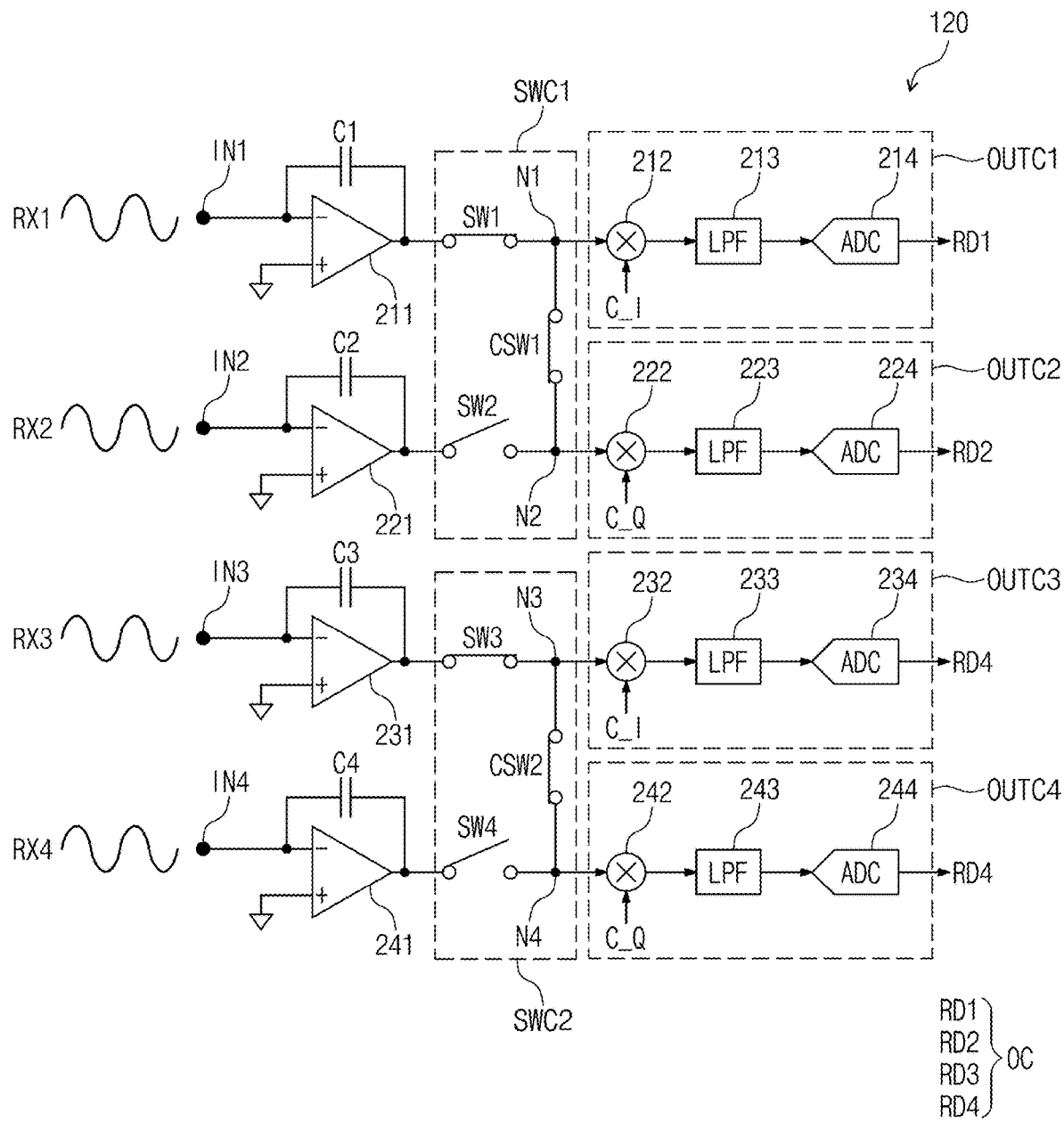
FIG. 12B is a diagram for describing an operation of a receiver during a first compensation period according to some embodiments of the present disclosure.

FIG. 12B is a diagram for describing an operation of the receiver 120 during a first compensation period.

Referring to FIGS. 11 and 12B, in each of the first compensation period COMP11 of the first frame F1, the first compensation period COMP21 of the second frame F2, and the first compensation period COMP31 of the third frame F3, the receiver 120 outputs the first to fourth sensing signals RD1, RD2, RD3, and RD4 corresponding to the first and third receive signals RX1 and RX3.

In each of the first compensation period COMP11, the first compensation period COMP21, and the first compensation period COMP31, the switches SW1 and SW3 and the coupling switches CSW1 and CSW2 are in the on state, and the switches SW2 and SW4 are in the off state.

Each of the mixers 212 and 232 receives the first carrier C_I, and each of the mixers 222 and 242 receives the second carrier C_Q.

The first receive signal RX1 input to the input terminal IN1 is transferred to the first node N1 and the second node N2 through the operational amplifier 211, the switch SW1, and the coupling switch CSW1. The first output circuit OUTC1 may convert the signal of the first node N1 into the first sensing signal RD1. The second output circuit OUTC2 may convert the signal of the second node N2 into the second sensing signal RD2.

The third receive signal RX3 input to the input terminal IN3 is transferred to the third node N3 and the fourth node N4 through the operational amplifier 231, the switch SW3, and the coupling switch CSW2. The third output circuit OUTC3 may convert the signal of the third node N3 into the third sensing signal RD3. The fourth output circuit OUTC4 may convert the signal of the fourth node N4 into the fourth sensing signal RD4.

The touch processor 130 illustrated in FIG. 8 may detect a phase delay (or a phase difference) of the first receive signal RX1 based on the first sensing signal RD1 and the second sensing signal RD2 received in each of the first compensation period COMP11, the first compensation period COMP21, and the first compensation period COMP31. The phase delay or phase difference of the first receive signal RX1 may correspond to a phase delay of the first receive signal RX1 caused with respect to the output signal TXS or a phase difference of the output signal TXS and the first receive signal RX1.

The touch processor 130 may detect a phase delay (or a phase difference) of the third receive signal RX3 based on the third sensing signal RD3 and the fourth sensing signal RD4 received in each of the first compensation period COMP11, the first compensation period COMP21, and the first compensation period COMP31.

The first to fourth sensing signals RD1 to RD4 that are output from the first to fourth output circuits OUTC1, OUTC2, OUTC3, and OUTC4 in each of the first compensation period COMP11, the first compensation period COMP21, and the first compensation period COMP31 may constitute a first compensation signal OC for the odd-numbered receive signals RX1 and RX3.

Figure 12C:
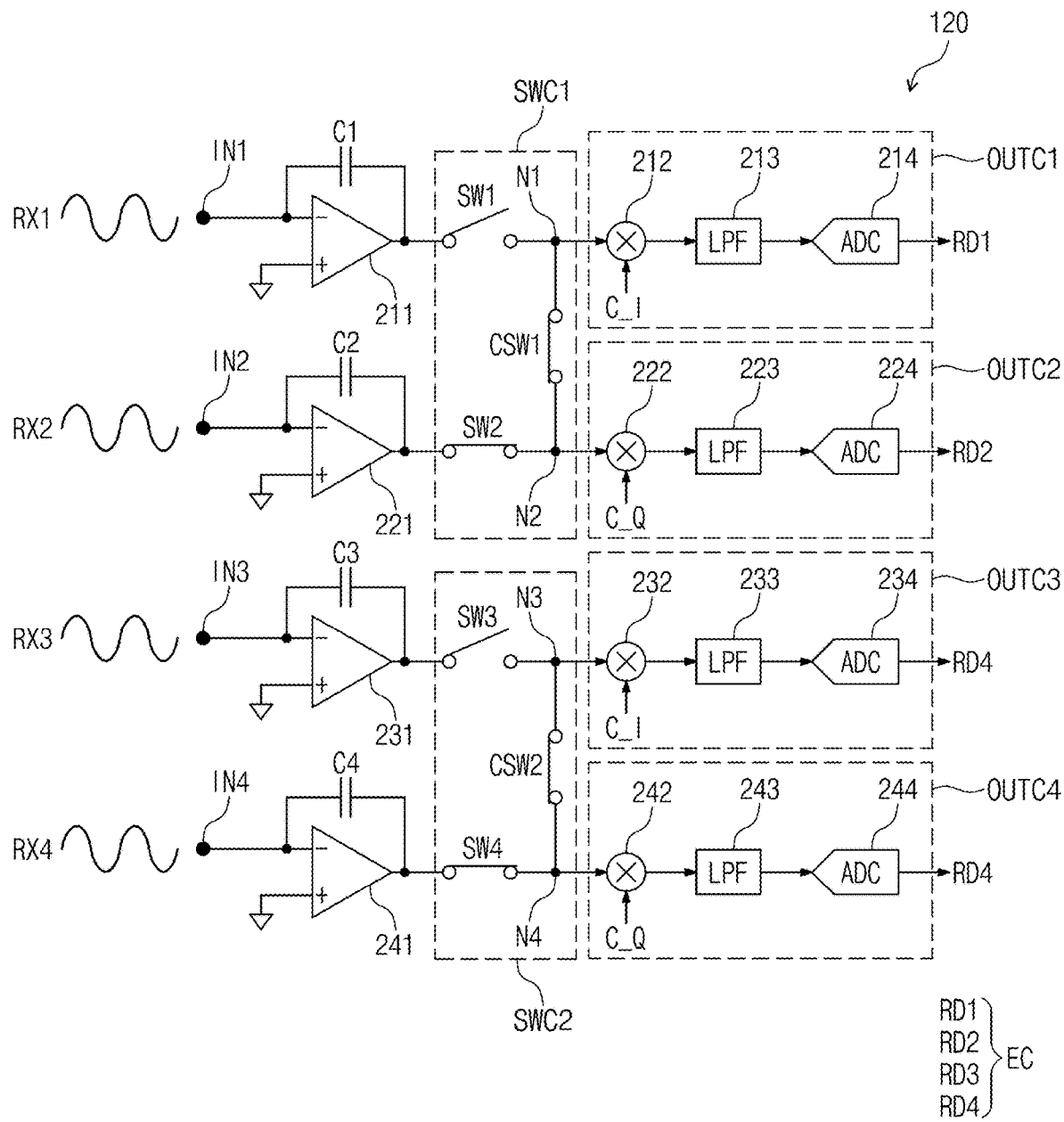
FIG. 12C is a diagram for describing an operation of a receiver during a second compensation period according to some embodiments of the present disclosure.

FIG. 12C is a diagram for describing an operation of the receiver 120 during a second compensation period.

Referring to FIGS. 11 and 12C, in each of the second compensation period COMP12 of the first frame F1, the second compensation period COMP22 of the second frame F2, and the second compensation period COMP32 of the third frame F3, the receiver 120 outputs the first to fourth sensing signals RD1, RD2, RD3, and RD4 corresponding to the second and fourth receive signals RX2 and RX4.

In each of the second compensation period COMP12, the second compensation period COMP22, and the second compensation period COMP32, the switches SW2 and SW4 and the coupling switches CSW1 and CSW2 are in the on state, and the switches SW1 and SW3 are in the off state.

Each of the mixers 212 and 232 receives the first carrier C_I, and each of the mixers 222 and 242 receives the second carrier C_Q.

The second receive signal RX2 input to the input terminal IN2 is transferred to the first node N1 and the second node N2 through the operational amplifier 221, the switch SW2, and the coupling switch CSW1. The first output circuit OUTC1 may convert the signal of the first node N1 into the first sensing signal RD1. The second output circuit OUTC2 may convert the signal of the second node N2 into the second sensing signal RD2.

The fourth receive signal RX4 input to the input terminal IN4 is transferred to the third node N3 and the fourth node N4 through the operational amplifier 241, the switch SW4, and the coupling switch CSW2. The third output circuit OUTC3 may convert the signal of the third node N3 into the third sensing signal RD3. The fourth output circuit OUTC4 may convert the signal of the fourth node N4 into the fourth sensing signal RD4.

The touch processor 130 illustrated in FIG. 8 may detect a phase delay (or a phase difference) of the second receive signal RX2 based on the first sensing signal RD1 and the second sensing signal RD2 received in each of the second compensation period COMP12, the second compensation period COMP22, and the second compensation period COMP32. The phase delay or phase difference of the second receive signal RX2 may correspond to a phase delay of the second receive signal RX2 caused with respect to the output signal TXS or a phase difference of the output signal TXS and the second receive signal RX2.

The touch processor 130 may detect a phase delay (or a phase difference) of the fourth receive signal RX4 based on the third sensing signal RD3 and the fourth sensing signal RD4 received in each of the second compensation period COMP12, the second compensation period COMP22, and the second compensation period COMP32.

The first to fourth sensing signals RD1 to RD4 that are output from the first to fourth output circuits OUTC1, OUTC2, OUTC3, and OUTC4 in each of the second compensation period COMP12, the second compensation period COMP22, and the compensation period COMP32 may constitute a second compensation signal EC for the even-numbered receive signals RX2 and RX4.

As illustrated in FIG. 11, the first compensation signal OC obtained during the first compensation period COMP11 of the first frame F1 and the second compensation signal EC obtained during the second compensation period COMP12 may be applied to the first to fourth sensing signals RD1 to RD4 obtained during the touch sensing period TS2 of the second frame F2.

That is, the touch processor 130 may compensate for phases of the first to fourth sensing signals RD1 to RD4 obtained during the touch sensing period TS2 of the second frame F2, based on the first to fourth sensing signals RD1 to RD4 (i.e., the first compensation signal OC) obtained during the first compensation period COMP11 of the first frame F1 and the first to fourth sensing signals RD1 to RD4 (i.e., the second compensation signal EC) obtained during the second compensation period COMP12 of the first frame F1. Therefore, even though the first to tenth transmit signals TX1 to TX10 (refer to FIG. 8) are delayed due to the RC delay, the touch processor 130 may accurately calculate the user input TC, that is, the touch location during the touch sensing period TS2 of the second frame F2.

The touch processor 130 may compensate for phases of the first to fourth sensing signals RD1 to RD4 obtained during the touch sensing period TS3 of the third frame F3, based on the first to fourth sensing signals RD1 to RD4 (i.e., the first compensation signal OC) obtained during the first compensation period COMP21 of the second frame F2 and the first to fourth sensing signals RD1 to RD4 (i.e., the second compensation signal EC) obtained during the second compensation period COMP22 of the second frame F2. Therefore, the touch processor 130 may accurately calculate the user input TC, that is, the touch location during the touch sensing period TS3 of the third frame F3.

Figure 13:
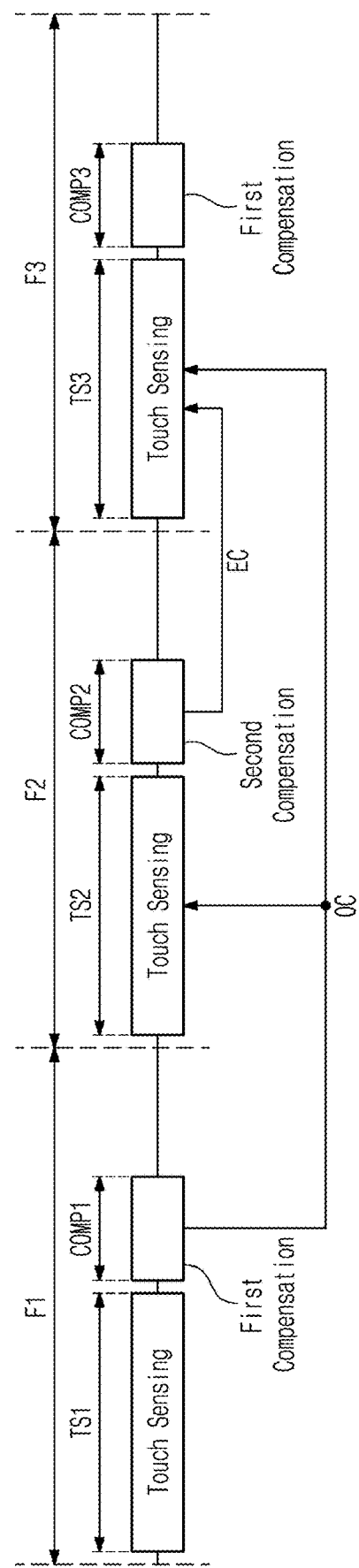
FIG. 13 is a diagram for describing an operation of a receiver according to some embodiments of the present disclosure.

FIG. 13 is a diagram for describing an operation of a receiver according to some embodiments.

Referring to FIG. 13, the first frame F1 may include a touch sensing period TS1 and a first compensation period COMP11.

The second frame F2 may include a touch sensing period TS2 and a second compensation period COMP2.

The third frame F3 may include a touch sensing period TS3 and a first compensation period COMP3.

Referring to FIGS. 12A and 13, in each of the touch sensing period TS1 of the first frame F1, the touch sensing period TS2 of the second frame F2, and the touch sensing period TS3 of the third frame F3, the receiver 120 outputs the first to fourth sensing signals RD1, RD2, RD3, and RD4 corresponding to the first to fourth receive signals RX1, RX2, RX3, and RX4.

Referring to FIGS. 12B and 13, in each of the first compensation period COMP1 of the first frame F1 and the first compensation period COMP3 of the third frame F3, the receiver 120 outputs the first to fourth sensing signals RD1, RD2, RD3, and RD4 corresponding to the first and third receive signals RX1 and RX3. The first to fourth sensing signals RD1, RD2, RD3, and RD4 may constitute the first compensation signal OC.

Referring to FIGS. 12C and 13, in the second compensation period COMP2 of the second frame F2, the receiver 120 outputs the first to fourth sensing signals RD1, RD2, RD3, and RD4 corresponding to the second and fourth receive signals RX2 and RX4. The first to fourth receive signals RD1, RD2, RD3, and RD4 may constitute the second compensation signal EC.

According to some embodiments, when a driving frequency of the display device DD (refer to FIG. 1) is high, a time (or a length) of each of the first to third frames F1, F2, and F3 is short. In this case, one frame may include only one of the first compensation period and the second compensation period. For example, the odd-numbered frames F1 and F2 respectively include the first compensation periods COMP1 and COMP3, and the even-numbered frame F2 includes the second compensation period COMP2.

The touch processor 130 may compensate for phases of the first to fourth sensing signals RD1 and RD4 obtained during the touch sensing period TS2 of the second frame F2 based on the first to fourth sensing signals RD1 and RD4 (i.e., the first compensation signal OC) obtained during the first compensation period COMP1 of the first frame F1.

The touch processor 130 may compensate for phases of the first to fourth sensing signals RD1 to RD4 obtained during the touch sensing period TS3 of the third frame F3, based on the first to fourth sensing signals RD1 to RD4 (i.e., the first compensation signal OC) obtained during the first compensation period COMP1 of the first frame F1 and the first to fourth sensing signals RD1 to RD4 (i.e., the second compensation signal EC) obtained during the second compensation period COMP2 of the second frame F2. Therefore, the touch processor 130 may accurately calculate the user input TC, that is, the touch location during the touch sensing period TS3 of the third frame F3.

Figure 14:
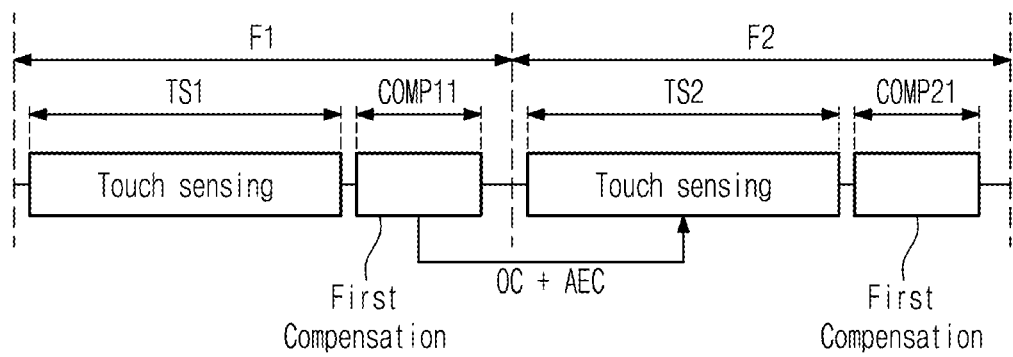
FIG. 14 is a diagram for describing an operation of a receiver according to some embodiments of the present disclosure.

FIG. 14 is a diagram for describing an operation of a receiver according to some embodiments.

Referring to FIG. 14, the first frame F1 may include a touch sensing period TS1 and a first compensation period COMP11.

The second frame F2 may include a touch sensing period TS2 and a first compensation period COMP21.

Referring to FIGS. 12A and 14, in each of the touch sensing period TS1 of the first frame F1 and the touch sensing period TS2 of the second frame F2, the receiver 120 outputs the first to fourth sensing signals RD1, RD2, RD3, and RD4 corresponding to the first to fourth receive signals RX1, RX2, RX3, and RX4.

Referring to FIGS. 12B and 14, in each of the first compensation period COMP11 of the first frame F1 and the first compensation period COMP21 of the second frame F2, the receiver 120 outputs the first to fourth sensing signals RD1, RD2, RD3, and RD4 corresponding to the first and third receive signals RX1 and RX3. The first to fourth sensing signals RD1, RD2, RD3, and RD4 may constitute the first compensation signal OC.

According to some embodiments, when a driving frequency of the display device DD (refer to FIG. 1) is high, a time (or a length) of each of the first and second frames F1 and F2 is short. In this case, one frame may include only one of the first compensation period and the second compensation period. For example, the first frame F1 includes the first compensation periods COMP11, and the second frame F2 includes the first compensation period COMP21.

The touch processor 130 calculates the first to fourth sensing signals RD1 to RD4 (e.g., a second compensation signal AEC) corresponding to the second and fourth receive signals RX2 and RX4 based on the first to fourth sensing signals RD1 to RD4 (e.g., the first compensation signal OC) corresponding to the first and third receive signals RX1 and RX3 obtained during the first compensation period COMP11 of the first frame F1.

For example, the touch processor 130 may output an average of the first and third sensing signals RD1 and RD3 corresponding to the first and third receive signals RX1 and RX3 obtained during the first compensation period COMP11 of the first frame F1, as the second sensing signal RD2 corresponding to the second receive signal RX2.

According to some embodiments, the touch processor 130 may output an average of sensing signals corresponding to third and fifth receive signals RX3 and RX5 obtained during the first compensation period COMP11 of the first frame F1, as the fourth sensing signal RD4 corresponding to the third receive signal RX3.

The touch processor 130 may compensate for phases of the first to fourth sensing signals RD1 and RD4 obtained during the touch sensing period TS2 of the second frame F2 based on the first to fourth sensing signals RD1 and RD4 (i.e., the first compensation signal OC) obtained the first compensation signal COMP11 of the first frame F1 and the second compensation period AEC calculated based on the first compensation signal OC (i.e., based on OC+AEC).

Therefore, the touch processor 130 may accurately calculate the user input TC, that is, the touch location during the touch sensing period TS2 of the second frame F2.

Figure 15:
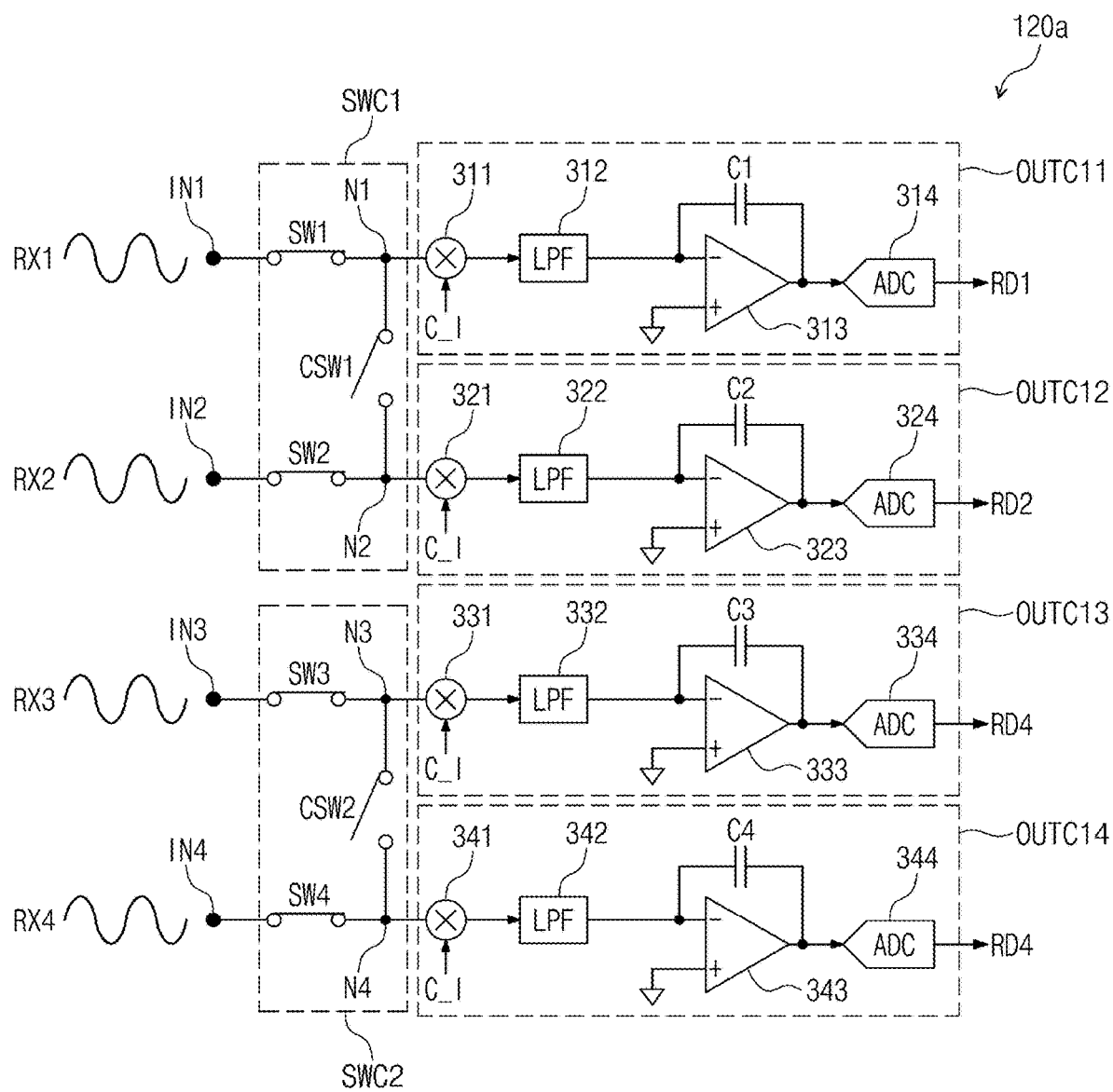
FIG. 15 is a diagram illustrating a partial configuration of a receiver according to some embodiments of the present disclosure.

FIG. 15 is a diagram illustrating a partial configuration of a receiver.

Referring to FIG. 15, a receiver 120a includes the switching circuits SWC1 and SWC2 and the first to fourth output circuits OUTC11, OUTC12, OUTC13, and OUTC14.

The switching circuit SWC1 includes the switches SW1 and SW2 and the coupling switch CSW1. The switch SW1 is connected between the input terminal IN1 and the first node IN1. The switch SW2 is connected between the input terminal node IN2 and the second node N2. The coupling switch CSW1 is connected between the first node N1 and the second node N2.

The switching circuit SWC2 includes the switches SW3 and SW4 and the coupling switch CSW2. The switch SW3 is connected between the input terminal node IN3 and the third node N3. The switch SW4 is connected between the input terminal node IN4 and the fourth node N4. The coupling switch CSW2 is connected between the third node N3 and the fourth node N4.

The first output circuit OUTC11 includes a mixer 311, a filter 312, an operational amplifier 313, a capacitor C1, and an analog-to-digital converter 314. The mixer 311 mixes and outputs a signal of the first node N1 and the first carrier C_I. The filter 312 filters and outputs an output of the mixer 311. The operational amplifier 313 includes a first input terminal connected with an output terminal of the filter 312, a second input terminal connected with the ground voltage, and an output terminal. The capacitor C1 is connected between the first input terminal and the output terminal of the operational amplifier 313. The analog-to-digital converter 314 converts an analog signal output from the output terminal of the operational amplifier 313 into a digital signal so as to be output as the first sensing signal RD1.

The second output circuit OUTC12 includes a mixer 321, a filter 322, an operational amplifier 323, a capacitor C2, and an analog-to-digital converter 324.

The third output circuit OUTC13 includes a mixer 331, a filter 332, an operational amplifier 333, a capacitor C3, and an analog-to-digital converter 334.

The fourth output circuit OUTC14 includes a mixer 341, a filter 342, an operational amplifier 343, a capacitor C4, and an analog-to-digital converter 344.

An operation of each of the second to fourth output circuits OUTC12, OUTC13, and OUTC14 is similar to the operation of the first output circuit OUTC11, and thus, additional description will be omitted to avoid redundancy.

An example in which the mixers 311, 321, 331, and 341 receive the first carrier C_I is illustrated in FIG. 15, but embodiments according to the present disclosure are not limited thereto. As illustrated in FIGS. 12B and 12C, the mixers 321 and 341 may receive the first carrier C_I during the touch sensing period and may receive the second carrier C_Q different from the first carrier C_I during the compensation period.

According to some embodiments, the operational amplifiers 313, 323, 333, and 343 may be respectively located between the first to fourth nodes N1, N2, N3, and N4 and the mixers 311, 321, 331, and 341.

According to some embodiments, the operational amplifiers 313, 323, 333, and 343 may be respectively located between the mixers 311, 321, 331, and 341 and the filters 312, 322, 332, and 342.

The input sensing device with the above configuration may demodulate a receive signal based on a delay characteristic of each transmission line. In this case, an error of the receive signal due to the delay characteristic of each transmission line may be minimized or reduced. Accordingly, the performance of input sensing of the input sensing device included in a display device may be relatively improved.

While the present disclosure has been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An input sensing device comprising:
   an input sensor including a transmission electrode, a first reception electrode, and a second reception electrode; and
   a readout circuit configured to provide a transmit signal to the transmission electrode, to receive a first receive signal from the first reception electrode, and to receive a second receive signal from the second reception electrode,
   wherein the readout circuit includes:
   a switching circuit configured to transfer the first receive signal and the second receive signal to a first node and a second node, respectively, during a touch sensing period and to transfer one of the first receive signal and the second receive signal to the first node and the second node during a compensation period;
   a first output circuit configured to convert a signal of the first node into a first sensing signal; and
   a second output circuit configured to convert a signal of the second node into a second sensing signal.

2. The input sensing device of claim 1, wherein, during the touch sensing period, the first output circuit is configured to mix the signal of the first node and a first carrier so as to be output as the first sensing signal, and the second output circuit is configured to mix the signal of the second node and the first carrier so as to be output as the second sensing signal.

3. The input sensing device of claim 1, wherein, during the compensation period, the first output circuit is configured to mix the signal of the first node and a first carrier so as to be output as the first sensing signal, and the second output circuit is configured to mix the signal of the second node and a second carrier different from the first carrier so as to be output as the second sensing signal.

4. The input sensing device of claim 3, wherein the first carrier is an in-phase carrier, and the second carrier is a quadrature phase carrier.

5. The input sensing device of claim 1, wherein the switching circuit includes:
   a first switch connected between a first reception line connected with the first reception electrode and the first node;
   a second switch connected between a second reception line connected with the second reception electrode and the second node; and
   a coupling switch connected between the first node and the second node.

6. The input sensing device of claim 5, wherein, during the touch sensing period, the first switch and the second switch are configured to be in an on state, and the coupling switch is configured to be in an off state.

7. The input sensing device of claim 5, wherein the compensation period includes a first compensation period and a second compensation period,
   wherein, during the first compensation period, the first switch and the coupling switch are configured to be in an on state, and the second switch is configured to be in an off state, and
   wherein, during the second compensation period, the second switch and the coupling switch are configured to be in the on state, and the first switch is configured to be in the off state.

8. The input sensing device of claim 1, wherein each of a first frame and a second frame includes the touch sensing period and the compensation period.

9. The input sensing device of claim 8, wherein the readout circuit is configured to calculate touch coordinates of the first frame based on the first sensing signal and the second sensing signal obtained during the touch sensing period of the first frame.

10. The input sensing device of claim 8, wherein the readout circuit is configured to calculate touch coordinates of the second frame based on the first sensing signal and the second sensing signal obtained during the compensation period of the first frame and the first sensing signal and the second sensing signal obtained during the touch sensing period of the second frame.

11. The input sensing device of claim 8, wherein, during the compensation period, the switching circuit is configured to output the first receive signal to the first node and the second node, and
    wherein the readout circuit is configured to calculate touch coordinates of the second frame based on the first sensing signal and the second sensing signal obtained during the compensation period of the first frame and the first sensing signal and the second sensing signal obtained during the touch sensing period of the second frame.

12. The input sensing device of claim 1, wherein each of a first frame, a second frame, and a third frame includes the touch sensing period and the compensation period,
    wherein, during the compensation period of each of the first frame and the third frame, the switching circuit is configured to output the first receive signal to the first node and the second node, and
    wherein, during the compensation period of the second frame, the switching circuit is configured to output the second receive signal to the first node and the second node.

13. The input sensing device of claim 12, wherein the readout circuit is configured to calculate touch coordinates of the second frame based on the first sensing signal and the second sensing signal obtained during the compensation period of the first frame and the first sensing signal and the second sensing signal obtained during the touch sensing period of the second frame, and
  wherein the readout circuit is configured to calculate touch coordinates of the third frame based on the first sensing signal and the second sensing signal obtained during the compensation period of the second frame and the first sensing signal and the second sensing signal obtained during the touch sensing period of the third frame.

14. A display device comprising:
a display panel;
an input sensor on the display panel and including a transmission electrode, a first reception electrode, and a second reception electrode; and
a readout circuit configured to output a transmit signal to the transmission electrode, to receive a first receive signal from the first reception electrode, and to receive a second receive signal from the second reception electrode,
wherein the readout circuit includes:
a switching circuit configured to transfer the first receive signal and the second receive signal to a first node and a second node, respectively, during a touch sensing period and to transfer one of the first receive signal and the second receive signal to the first node and the second node during a compensation period;
a first output circuit configured to convert a signal of the first node into a first sensing signal; and
a second output circuit configured to convert a signal of the second node into a second sensing signal.

15. The display device of claim 14, wherein, during the touch sensing period, the first output circuit is configured to mix the signal of the first node and a first carrier so as to be output as the first sensing signal, and the second output circuit is configured to mix the signal of the second node and the first carrier so as to be output as the second sensing signal.

16. The display device of claim 14, wherein, during the compensation period, the first output circuit is configured to mix the signal of the first node and a first carrier so as to be output as the first sensing signal, and the second output circuit is configured to mix the signal of the second node and a second carrier different from the first carrier so as to be output as the second sensing signal.

17. The display device of claim 14, wherein the switching circuit includes:
a first switch connected between a first reception line connected with the first reception electrode and the first node;
a second switch connected between a second reception line connected with the second reception electrode and the second node; and
a coupling switch connected between the first node and the second node.

18. The display device of claim 17, wherein, during the touch sensing period, the first switch and the second switch are configured to be in an on state, and the coupling switch is configured to be in an off state.

19. The display device of claim 17, wherein the compensation period includes a first compensation period and a second compensation period,
  wherein, during the first compensation period, the first switch and the coupling switch are configured to be in an on state, and the second switch is configured to be in an off state, and
  wherein, during the second compensation period, the second switch and the coupling switch are configured to be in the on state, and the first switch is configured to be in the off state.

20. The display device of claim 14, wherein each of a first frame and a second frame includes the touch sensing period and the compensation period,
  wherein the readout circuit is configured to calculate touch coordinates of the first frame based on the first sensing signal and the second sensing signal obtained during the touch sensing period of the first frame, and
  wherein the readout circuit is configured to calculate touch coordinates of the second frame based on the first sensing signal and the second sensing signal obtained during the compensation period of the first frame and the first sensing signal and the second sensing signal obtained during the touch sensing period of the second frame.

* * * * *